(12) United States Patent
Jeong et al.

(10) Patent No.: US 9,020,641 B2
(45) Date of Patent: Apr. 28, 2015

(54) OBSTACLE SENSING MODULE AND CLEANING ROBOT INCLUDING THE SAME

(71) Applicant: Samsung Electronics Co., Ltd., Suwon-si, Gyeonggi-do (KR)

(72) Inventors: Yeon Kyu Jeong, Suwon (KR); Dong Won Kim, Hwaseong (KR); Jea Yun So, Suwon (KR); Sang Sik Yoon, Gimpo (KR); Gwang Jin Jung, Suwon (KR); Joon Hyung Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 180 days.

(21) Appl. No.: 13/911,525

(22) Filed: Jun. 6, 2013

(65) Prior Publication Data

US 2013/0331990 A1    Dec. 12, 2013

(30) Foreign Application Priority Data

Jun. 7, 2012   (KR) .......................... 10-2012-0061059
May 30, 2013   (KR) .......................... 10-2013-0061815

(51) Int. Cl.
*G05D 1/02* (2006.01)
*G01S 17/93* (2006.01)
(Continued)

(52) U.S. Cl.
CPC ............ *G05D 1/0231* (2013.01); *G01S 17/936* (2013.01); *G01S 7/4802* (2013.01); *G01S 7/4811* (2013.01); *G05D 1/0238* (2013.01); *G02B 5/02* (2013.01); *G05D 2201/0203* (2013.01)

(58) Field of Classification Search
CPC ............... B60R 21/01534; B60R 21/01536; B60R 21/01538; B60R 21/0134; B60R 2001/1223; B60R 2001/1253; B60R 21/013; F21Y 2101/02; F21Y 2113/00; G02B 2027/014; G02B 27/123; G02B 27/126; G02B 27/145

USPC .......... 700/259, 255, 258; 359/619, 627, 626, 359/620, 639
See application file for complete search history.

(56) References Cited

U.S. PATENT DOCUMENTS

| 5,764,828 A | 6/1998 | Iga et al. |
|---|---|---|
| 7,009,713 B2 * | 3/2006 | Seko et al. ..................... 356/498 |

(Continued)

FOREIGN PATENT DOCUMENTS

| EP | 2236069 | 10/2010 |
|---|---|---|
| JP | 5-26663 | 2/1993 |

(Continued)

OTHER PUBLICATIONS

PCT International Search Report mailed Sep. 17, 2013 in corresponding International Application No. PCT/KR2013/005020.

(Continued)

*Primary Examiner* — Ronnie Mancho
(74) *Attorney, Agent, or Firm* — Staas & Halsey LLP

(57) ABSTRACT

Disclosed herein are an obstacle sensing module and a cleaning robot including the same. The cleaning robot includes a body, a driver to drive the body, an obstacle sensing module to sense an obstacle present around the body, and a control unit to control the driver, based on sensed results of the obstacle sensing module. The obstacle sensing module includes at least one light emitter including a light source, and a wide-angle lens to refract or reflect light from the light source so as to diffuse the incident light in the form of planar light, and a light receiver including a reflection mirror to again reflect reflection light reflected by the obstacle so as to generate reflection light, an optical lens spaced from the reflection mirror by a predetermined distance, to allow the reflection light to pass through the optical lens, and an image sensor, and an image processing circuit.

22 Claims, 52 Drawing Sheets

(51) Int. Cl.
*G01S 7/48* (2006.01)
*G01S 7/481* (2006.01)
*G02B 5/02* (2006.01)

(56) References Cited

U.S. PATENT DOCUMENTS

| | | | | |
|---|---|---|---|---|
| 7,372,062 | B2 * | 5/2008 | Tanaka | 250/559.45 |
| 7,554,676 | B2 * | 6/2009 | Seko | 356/614 |
| 7,633,628 | B2 * | 12/2009 | Seko | 356/498 |
| 7,791,736 | B2 * | 9/2010 | Seko et al. | 356/498 |
| 7,830,605 | B2 * | 11/2010 | Seko | 359/619 |
| 2008/0276407 | A1 | 11/2008 | Schnittman et al. | |
| 2009/0048727 | A1 | 2/2009 | Hong et al. | |

FOREIGN PATENT DOCUMENTS

| | | |
|---|---|---|
| JP | 11-190630 | 7/1999 |
| KR | 10-2008-0093768 | 10/2008 |
| KR | 10-2011-0124506 | 11/2011 |
| WO | 99/46612 | 9/1999 |

OTHER PUBLICATIONS

Extended European Search Report dated Sep. 13, 2013 in European Patent Application No. 13171077.4.

In Soo Jeong et al., "Self-localization for Mobile Robots by Matching of Two Consecutive Environmental Range Data", Proceedings of the 2001 IEEE International Conference on Robotics & Automation, May 2001, pp. 1603-1608.

Rui Guo et al., "Omni-directional Vision for Robot Navigation in Substation Environments", Proceedings of the 2009 IEEE International Conference on Robotics & Biomimetics, Dec. 2009, pp. 1272-1275.

Yasushi Yagi et al., "Real-time Generation of Environment May and Obstacle Avoidance using Omnidirectional Image Sensor with Conic Mirror", Proceedings of the Computer Society Conference on Computer Vision and Pattern Recognition, Jun. 1991, pp. 160-165.

* cited by examiner (a)

(b)

(a)

(b)

(c)

(d)

(a)

(b)

(c)

(d)

(a)

(b)

(c)

(d)

(a)

(b)

(c)

(d)

(a)

(b)

(c)

(d)

OBSTACLE SENSING MODULE AND CLEANING ROBOT INCLUDING THE SAME

CROSS-REFERENCE TO RELATED APPLICATION

This application claims the priority benefit of Korean Patent Application No. 10-2012-0061059, filed on Jun. 7, 2012 in the Korean Intellectual Property Office, and Korean Patent Application No. 10-2013-0061815, filed on May 30, 2013 in the Korean Intellectual Property Office, the disclosures of which are incorporated herein by reference.

BACKGROUND

1. Field

Embodiments relate to an obstacle sensing module capable of sensing an obstacle present therearound, and a cleaning robot including the same.

2. Description of the Related Art

Generally, an obstacle sensor irradiates light, ultrasonic waves or the like, and detects light or ultrasonic waves returned after being reflected from obstacles in the form of detect signals. Based on time differences, phase differences or intensity differences among the detect signals, the obstacle sensor discriminates whether or not there is an obstacle and the distance from the sensor to the obstacle. The obstacle sensor may discriminate the distance from the sensor to the obstacle, based on reflection angles of the reflected light or ultrasonic waves.

Recently, an obstacle sensing method employing a point light source has been proposed. However, when a point light source is employed, a plurality of light emitters should be installed, and there may be a non-sensible zone in spite of installation of such plural light emitters. When the point light source is rotatable to solve the above-mentioned problems, a separate servo mechanism is needed. Furthermore, a certain scanning time is required. For this reason, there may be degradation in efficiency.

SUMMARY

In an aspect of one of more embodiments, there is provided an obstacle sensing module capable of sensing an obstacle present therearound through formation of uniform planar light using a wide-angle lens, and a cleaning robot including the same.

In an aspect of one or more embodiments, there is provided a cleaning robot which includes a body, a driver to drive the body, an obstacle sensing module to sense an obstacle present around the body, and a control unit to control the driver, based on sensed results of the obstacle sensing module, wherein the obstacle sensing module includes at least one light emitter including a light source, a wide-angle lens to refract or reflect light incident from the light source to diffuse the incident light in the form of planar light, and a light source driver to drive the light source to emit light, and a light receiver including a reflection mirror to reflect reflection light reflected by the obstacle to generate reflection light, an optical lens spaced from the reflection mirror by a predetermined distance, to allow the reflection light to pass through the optical lens, an image sensor to receive the reflection light emerging from the optical lens and to generate an image signal from the reflection light emerging from the optical lens, and an image processing circuit to receive the image signal, and to convert the received image signal into an image signal in the form of a digital image signal.

The obstacle sensing module may further include an obstacle sensing controller to generate optical control signals to control turn-on/off of the light source, and to generate obstacle sensing information, based on the digital image signal.

The control unit may generate a drive control signal, based on the obstacle sensing information.

The control unit may generate optical control signals to control turn-on/off of the light source, may generate obstacle sensing information, based on the digital image signal, or may generate a drive control signal, based on the obstacle sensing information.

The obstacle sensing information may include at least one of a distance from the body to the obstacle, a position of the obstacle, a height of the obstacle, a shape of the obstacle, and a fall point.

The optical control signal to control turn-off of the light source may be generated when the cleaning robot is lifted from a floor.

The optical control signal to control turn-on of the light source may be generated when the cleaning robot starts to travel, and the optical control signal to control turn-off of the light source may be generated when the cleaning robot completes traveling.

In an aspect of one or more embodiments, there is provided a cleaning robot which includes a body, a driver to drive the body, an obstacle sensing module to sense an obstacle present around the body, and a control unit to control the driver, based on sensed results of the obstacle sensing module, wherein the obstacle sensing module includes at least one light emitter including a light source, and a wide-angle lens to diffuse light incident from the light source in the form of planar light, and a light receiver including an image sensor to receive reflection light reflected by the obstacle and to generate an image signal from the reflected received line light.

In an aspect of one or more embodiments, there is provided an obstacle sensing module installed in a cleaning robot which includes at least one light emitter including a light source, a wide-angle lens to refract or reflect light incident from the light source to diffuse the incident light in the form of planar light, and a light source driver to drive the light source to emit light, and a light receiver including a reflection mirror to reflect reflection light reflected by an obstacle to generate reflection light, an optical lens spaced from the reflection mirror by a predetermined distance, to allow the reflection light to pass through the optical lens, an image sensor to receive the reflection light emerging from the optical lens to generate an image signal from the reflection light emerging from the optical lens, and an image processing circuit to receive the image signal, and to convert the received image signal into an image signal in the form of a digital image signal.

The light emitter may further include a slit disposed in front of the wide-angle lens, to adjust a thickness of the planar light.

The optical lens may be arranged between the reflection mirror and the image sensor, and the light emitter may be arranged in front of the image sensor.

The at least one light emitter may include a plurality of light emitters disposed at different positions on the cleaning robot and being arranged at a same level from a floor.

The plurality of light emitters may diffuse planar light in a simultaneous manner or in a sequential manner.

The plurality of light emitters may include first to third light emitters disposed on the cleaning robot. The light receiver may be disposed at a front side of the cleaning robot. The first light emitter may be arranged in front of the light receiver. The second light emitter may be spaced from the first light emitter in a left direction by a predetermined distance. The third light emitter may be spaced from the first light emitter in a right direction by a predetermined distance.

The plurality of light emitters may include first to fourth light emitters disposed on the cleaning robot. The light receiver may be disposed at a front side of the cleaning robot. The first and second light emitters may be spaced from the light receiver in a left direction by a predetermined distance. The third and fourth light emitters may be spaced from the light receiver in a right direction by a predetermined distance.

The reflection mirror may be a conical reflection mirror arranged such that an apex of the conical reflection mirror faces the image sensor.

The reflection mirror may have a conical structure formed with a conical surface having a side surface portion extending from a bottom surface of the conical structure to a predetermined height and having a concave shape, and a side surface portion extending from the predetermined height to an apex of the conical structure and having a convex shape.

A filter may be coated over a surface of the optical sensor, a surface of the reflection mirror, or a surface of the optical lens, to allow light having a wavelength of the planar light to pass through the optical lens.

The obstacle sensing module may further include an obstacle sensing controller to generate optical control signals to control turn-on/off of the light source, and to generate obstacle sensing information, based on the digital image signal.

The obstacle sensing information may include at least one of a distance from the body to the obstacle, a position of the obstacle, a height of the obstacle, a shape of the obstacle, and a fall point.

In an aspect of one or more embodiments, there is provided a wide-angle lens formed of a transparent material to allow light incident from a light source to pass therethrough. The wide-angle lens includes a first diffusion surface to refract the light incident from the light source to diffuse the incident light within the wide-angle lens, a second diffusion surface to refract or reflect the light refracted by the first diffusion surface to generate planar light, and a holding recess formed at a surface opposite to the first diffusion surface, to hold the light source received therein.

The wide-angle lens may further include a third diffusion surface to refract the light refracted by the first diffusion surface or the light reflected by the second diffusion surface to generate planar light.

The second diffusion surface may be formed at one surface of the second wide-angle lens, to have a U or V-shaped concave structure.

The second diffusion surface may include a first surface formed at a central portion of the second diffusion surface, to extend perpendicularly in a forward direction in the form of a flat surface, and second surfaces having a curved shape and forming a predetermined angle with regard to the first surface. The first surface may refract the light reflected by the first diffusion surface to generate planar light. The second surfaces may reflect, toward the third diffusion surfaces, the light reflected by the first diffusion surface.

A diffusion range of the planar light may be adjusted in accordance with the predetermined angle or a curvature of the curved shape.

The second diffusion surface may be formed with wave patterns each having a tapered ridge.

The second diffusion surface may be formed at one surface of the wide-angle lens and has a concave conical shape. The holding recess may have a central axis aligned with a central axis of the second diffusion surface.

The second diffusion surface or the third diffusion surface may have a convex shape to reduce a thickness of the planar light.

The at least one light emitter may include a plurality of light emitters disposed at different positions on the cleaning robot or at different levels from a floor.

The at least one light emitter may include a plurality of light emitters disposed at a same position on the cleaning robot and at different levels from a floor.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
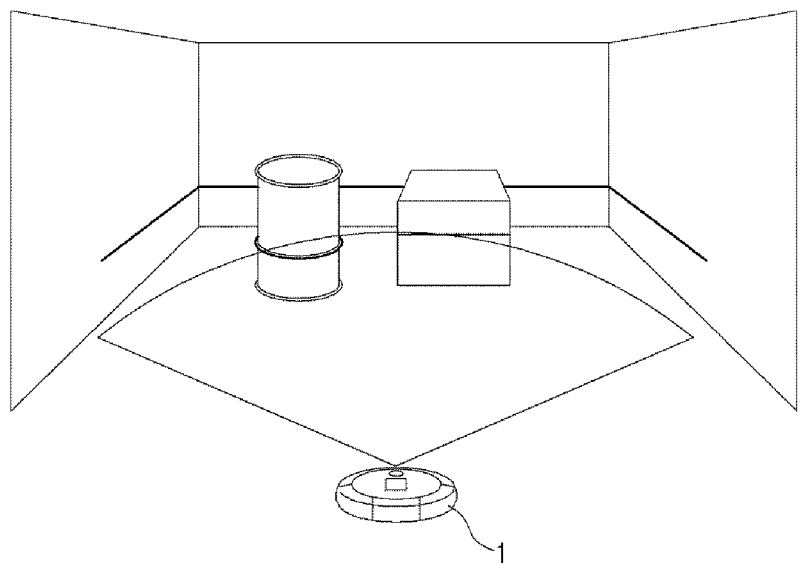
FIG. 1 is a concept view of a cleaning robot including an obstacle sensing module according to an exemplary embodiment.

Reference will now be made in detail to embodiments, examples of which are illustrated in the accompanying drawings, wherein like reference numerals refer to the like elements throughout.

Hereinafter, embodiments will be described with reference to the accompanying drawings.

FIG. 1 is a concept view of a cleaning robot including an obstacle sensing module according to an exemplary embodiment.

As illustrated in FIG. 1, the cleaning robot according to an exemplary embodiment, which is designated by reference numeral '1', is a device for automatically cleaning a region to be cleaned by sucking foreign matter such as dust from a floor of the cleaning region while autonomously traveling about the cleaning region without user control. The cleaning robot 1 senses an obstacle or a wall, which is located within a region to be cleaned, through various sensors or the like. Based on the sensed results, the cleaning robot 1 controls a travel path thereof and a cleaning operation thereof.

In particular, the cleaning robot 1 irradiates planar light while traveling in a room, and senses obstacles present in paths, along which the planar light is irradiated. "Planar light" means thin light beams advancing in various directions on the same plane after being emitting from a light source, as will be described later.

The cleaning robot 1 is equipped with an obstacle sensing module (not shown) and, as such, may sense a region therearound in omni-directions or a fan-shaped wide region. Based on sensed results of the obstacle sensing module, the cleaning robot 1 may determine the distance to an obstacle present in the region, the position of the obstacle, the height of the obstacle, the shape of the obstacle, and a fall point. Based on results of the determination, the cleaning robot 1 may determine an environment of the region to be cleaned, and may then execute a cleaning operation for the region.

Figure 2A:
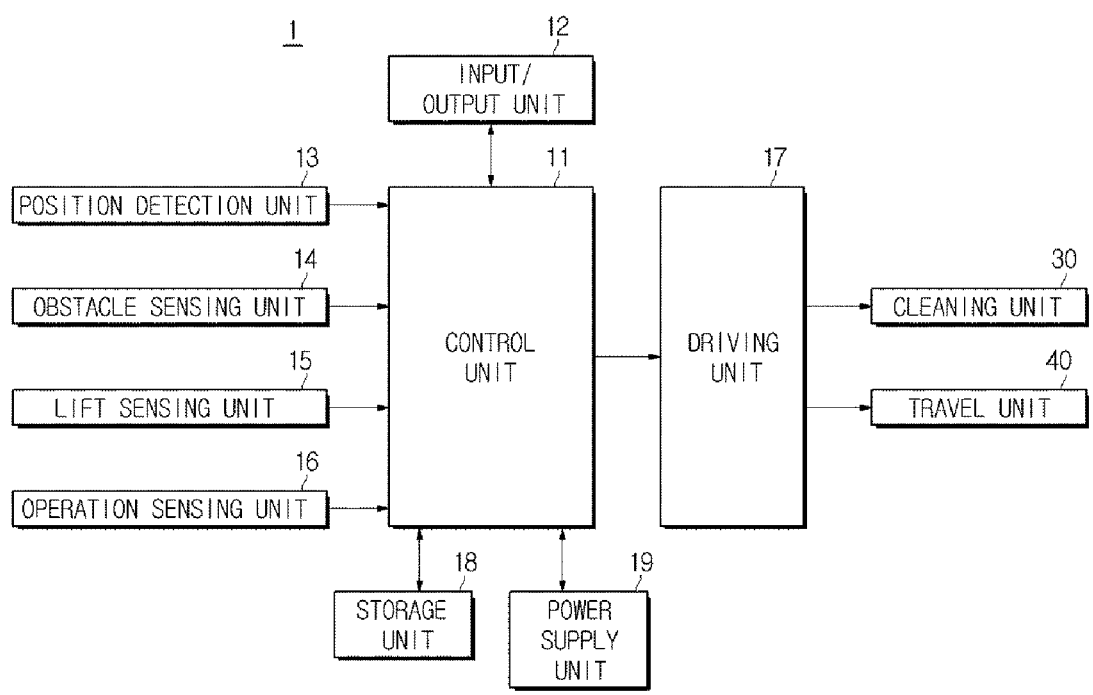
FIG. 2A is a block diagram illustrating a control configuration of the cleaning robot which includes an obstacle sensing module according to an exemplary embodiment.
Figure 2B:
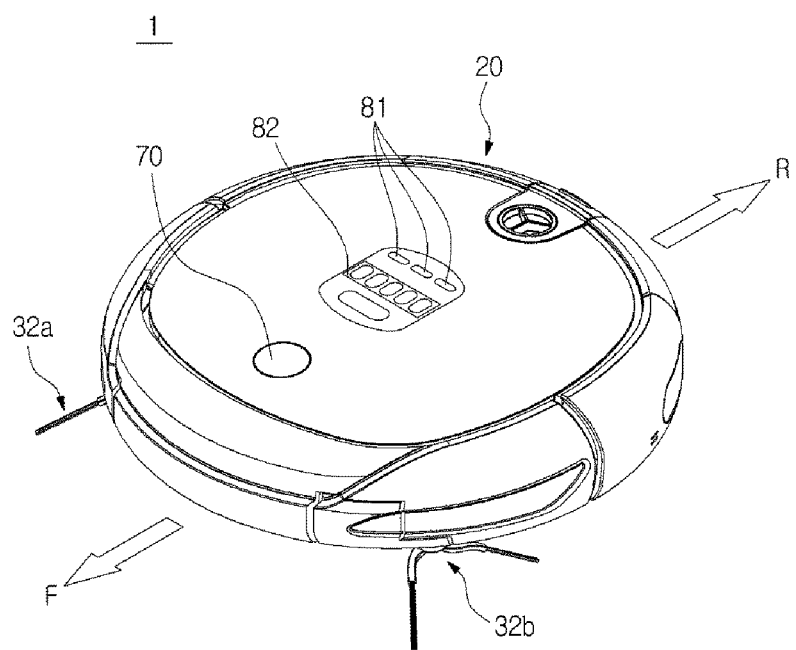
FIG. 2B is a perspective view of the cleaning robot including the obstacle sensing module according to an exemplary embodiment.
Figure 2C:
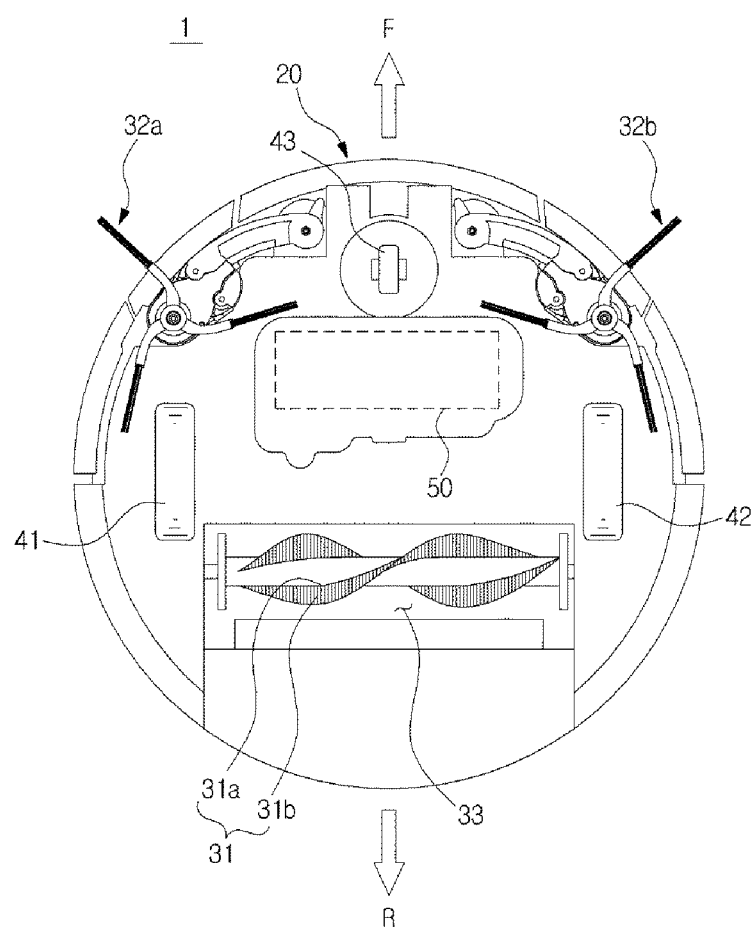
FIG. 2C is a rear view of the cleaning robot including the obstacle sensing module according to an exemplary embodiment.
Figure 2D:
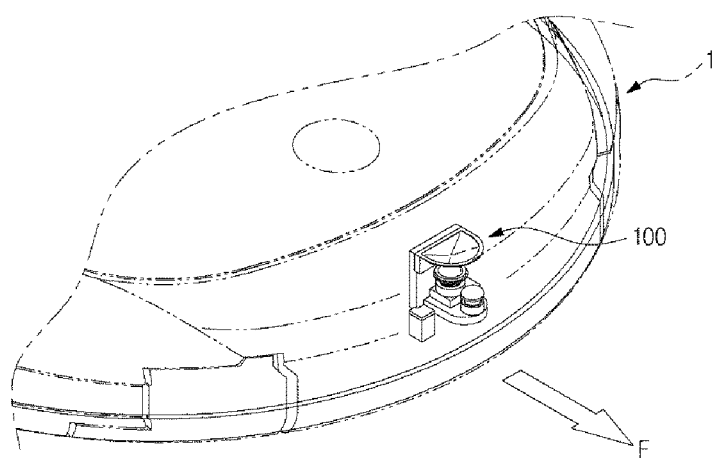
FIG. 2D is a perspective view illustrating the obstacle sensing module according to an exemplary embodiment.

FIG. 2A is a block diagram illustrating a control configuration of the cleaning robot which includes an obstacle sensing module according to an exemplary embodiment. FIG. 2B is a perspective view of the cleaning robot including the obstacle sensing module according to an exemplary embodiment. FIG. 2C is a rear view of the cleaning robot including the obstacle sensing module according to an exemplary embodiment. FIG. 2D is a perspective view illustrating the obstacle sensing module according to an exemplary embodiment.

Referring to FIGS. 2A to 2D, the cleaning robot 1 includes a body 20 to form an appearance of the cleaning robot 1. The cleaning robot 1 also includes a cleaning unit to clean a space to be cleaned (hereinafter, referred to as a "cleaning space"), a travel unit 40 to move the cleaning robot 1, an input/output unit 12 to receive operation commands for the cleaning robot 1, and to display information as to operation of the cleaning robot 1, a position detection unit 13 to detect a position of the cleaning robot 1 in the cleaning space, an obstacle sensing unit 14 to sense an obstacle disposed in the cleaning space, a lift sensing unit 15 to sense lifting of the cleaning robot 1 from a floor of the cleaning space, an operation sensing unit 16 to sense movement of the cleaning robot 1, a driving unit 17 to drive the travel unit 40 and cleaning unit 30, a storage unit 18 to store various data, a power supply unit 19 to supply power to the cleaning robot 1, and a control unit 11 to control constituent elements of the cleaning robot 1.

The cleaning unit 30 includes a main brush unit 31 to sweep dust present on a floor so as to guide the swept dust to a suction port, and side brush units 32a and 32b to clean an area adjacent to a wall and a corner area.

The main brush unit 31 may be mounted at an opening 33 formed at a bottom of the body 20, to sweep dust accumulated on the floor, on which the body 20 is disposed. The opening 33 may be formed at a portion of the bottom of the body 20 biased from a central region of the body 20 in a rearward direction R. The opening 33 may function as a dust inlet into which dust is introduced. The main brush unit 31 may include a roller 31a, and a main brush 31b stuck in an outer surface of the roller 31a.

The roller 31a functions to rotate the main brush 31b. As the roller 31a rotates, the main brush 31b sweeps dust accumulated on the floor such that the swept dust is guided to the dust inlet 33. In this case, the roller 31a may be formed of a rigid steel body, and the main brush 31b may be made of various materials having elasticity. Of course, embodiments are not limited to such materials.

Although not shown, the cleaning unit 30 may include a fan unit (not shown) provided within the opening 33, to generate suction force. The fan unit functions to move dust introduced into the dust inlet to a dust collector (not shown).

The travel unit 40 includes travel wheels 41 and 42 to move the body 20 in accordance with a travel control signal, and a caster 43 to enables the body 20 to enable the body 20 to maintain a stable posture while rotating in accordance with a travel direction of the cleaning robot 1.

For example, two travel wheels 41 and 42 may be centrally arranged at opposite sides of the bottom of the body 20 in a symmetrical manner, respectively. The travel wheels 41 and 42 may perform movement operations including forward movement, backward movement, and rotation under the control of the drive circuit during a cleaning operation of the cleaning robot 1.

The caster 43 may be installed at a front edge portion of the bottom of the body 20 when viewed on the basis of a travel direction.

The travel wheels 41 and 42, and caster 43 may be configured into a single assembly detachably mounted to the body 20.

The input/output unit 12 is provided at a top surface of the robot body 20. The input/output unit 12 includes a plurality of operating buttons 81 to input operation commands for the cleaning robot 1 from the user, and a display panel 82 to display information as to operation of the cleaning robot, for example, information as to whether the cleaning robot 1 operates, information as to a travel mode, etc. Membrane switches may be employed as the operating buttons 81. As the display panel 82, a liquid crystal display (LCD) panel or a light emitting diode (LED) panel may be employed.

The position detection unit 13 may include a top camera module 70 to acquire a top image of the cleaning robot 1, namely, an image of a ceiling in the cleaning space.

For example, when the cleaning robot 1 travels in a random direction under the condition that there is no predetermined path, along which the cleaning robot 1 travels, that is, when the cleaning robot 1 travels, using the obstacle sensing module, it may travel about a cleaning region, using an obstacle sensing module. In this case, the position detection unit 13 may photograph a top image of the cleaning robot 1, using the top camera module 70 to generate information as to a position of the cleaning robot 1.

The obstacle sensing unit 14 includes an obstacle sensing module 100 to irradiate planar light in a forward or lateral direction of the cleaning robot 1, and then to detect reflection light reflected from an obstacle, for obstacle detection.

Referring to FIG. 2D, the obstacle sensing module 100 is mounted to the front side of the cleaning robot 1 when viewed in a travel direction of the cleaning robot 1. Of course, when a plurality of obstacle sensing modules 100 is installed in the cleaning robot 1, the mounting position thereof may further include a position different from the front side of the robot 1.

The obstacle sensing module 100 will be described in detail below.

The lift sensing unit 15 may include a separation sensor module (not shown) to sense separation of the travel wheels 41 and 42. In detail, when the cleaning robot 1 is separated from the floor of the cleaning space, the travel wheels 41 and 42 may be separated from original positions thereof. In this case, the separation sensing module senses separation of the travel wheels 41 and 42. As will be described later, when lifting of the cleaning robot 1 is sensed by the lift sensing unit 15, the cleaning robot 1 turns off a light source (not shown) included in the obstacle sensing module (not shown).

The operation sensing unit 16 may include an accelerometer (not shown), a gyro sensor, or the like, to sense translation and rotation of the cleaning unit 16. The operation sensing unit 16 generates information as to travel of the cleaning robot 1. A light source driver which is included in the obstacle sensing module operates based on the travel information. For example, when the light source driver which will be described later receives a travel signal from the operation sensing unit 16, it may turn on the light source. On the other hand, when the light source driver receives a stop signal, it may turn off the light source.

The storage unit 18 may include a non-volatile memory (not shown) such as a magnetic disc or a solid state disc) to permanently store programs and control data to control operation of the cleaning robot 1, and a volatile memory (not shown) such as a D-RAM or an S-RAM to store temporary data generated during control of operation of the cleaning robot 1.

The power supply unit 19 includes a battery 50 to supply drive power to constituent elements of the cleaning robot 1.

The battery 50 may be a rechargeable secondary battery. When the body 20 is coupled to a charger or a docking station (not shown) after completing a cleaning operation, the battery 50 may receive electric power from the docking station, to be charged.

The control unit 11 functions to control driving of the cleaning robot 1, based on sensed results of the obstacle sensing module 100 in the cleaning robot 1. For example, the control unit 11 may set a travel path, based on information as to a surrounding environment of the cleaning robot 1, namely, obstacle sensing information, and may generate a drive control signal for control operations as to travel and cleaning operations of the cleaning robot 1.

In this case, the obstacle sensing information may include the distance from the body 20 to the sensed obstacle, the position of the obstacle, the height of the obstacle, the shape of the obstacle, a fall point, etc. The obstacle sensing information may be received from the obstacle sensing module 100 or may be directly generated from the control unit 11.

Heretofore, the configuration of the cleaning robot 1 has been described. Hereinafter, the obstacle sensing module included in the cleaning robot will be described.

Figure 3A:
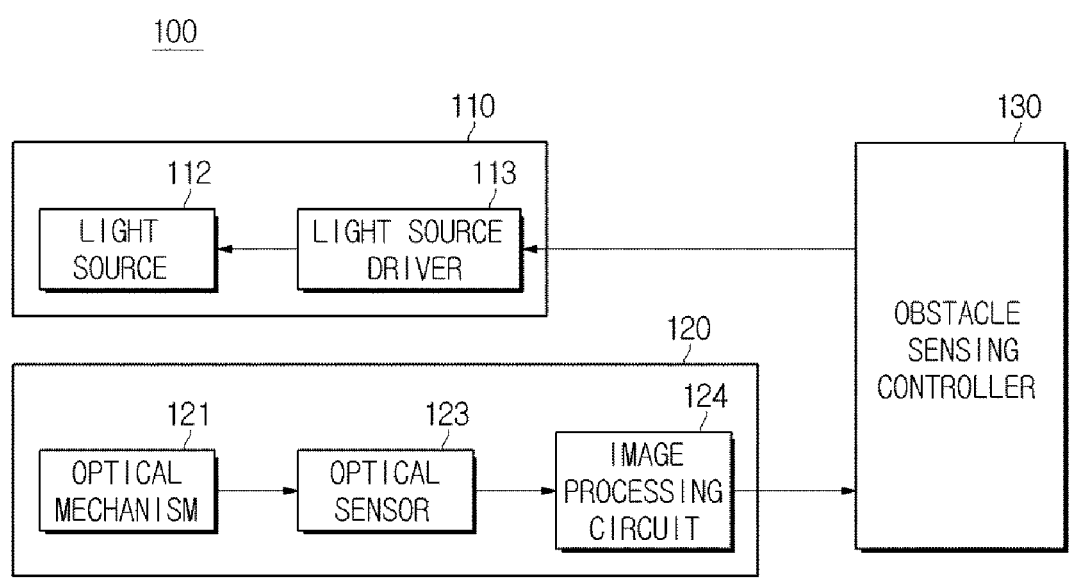
FIG. 3A is a block diagram of a control configuration of the obstacle sensing module according to an exemplary embodiment.

FIG. 3A is a block diagram of a control configuration of the obstacle sensing module according to an exemplary embodiment.

Referring to FIG. 3A, the obstacle sensing module 100 may include at least one light emitter 110 to diffuse light emitted from a light source 112 so as to emit planar light, a light receiver 120 to receive reflection light reflected from an obstacle so as to generate an electrical image signal, and an obstacle sensing controller 130.

The light source 112 is included in the light emitter 110. The light emitter 110 may further include a light source driver 113 to drive the light source 112.

The light source 112 functions to emit light. The light source 112 may be a laser diode (LD), a light emitting diode (LED), or the like. Light emitted from the light source 112 may include invisible infrared light, visible light, etc. The light source 112 may generate light having the form of beams advancing in one direction.

The light source driver 113 may drive the light source 112 to emit light in accordance with a light control signal from the obstacle sensing controller 130, and may feed back an intensity of irradiated light, using a photodiode (not shown) or the like.

The light receiver 120 may include an optical mechanism 121 to change a path of reflection light reflected from an obstacle, an optical sensor 123 to receive the path-changed reflection light and thus to generate an electrical image signal, and a signal processing circuit 124 to receive the electrical signal and then to convert the received signal into a digital signal. Of course, when the optical sensor 123 has a function to convert an electrical image signal into a digital signal, the light receiver 120 may dispense with the signal processing circuit 124.

The optical mechanism 121 changes a path of reflection light reflected from an obstacle such that the reflection light is directed to the optical sensor 123 which will be described later. As the optical mechanism 121, any one of a mirror, a lens, a total reflection prism, etc. which may change a path of light may be employed.

For example, when a mirror is employed as the optical mechanism 121, the optical mechanism 121 again reflects reflection light reflected from an obstacle such that the reflection light is directed to the optical sensor. On the other hand, when a lens is employed as the optical mechanism 121, the optical mechanism 121 refracts reflection light reflected from an obstacle such that the reflection light is directed to the optical sensor. In addition, when a total reflection prism is employed as the optical mechanism 121, the optical mechanism 121 reflects or refracts reflection light reflected from an obstacle such that the reflection light is directed to the optical sensor.

A filter may be coated over a surface of the optical mechanism 121 or optical sensor 123 of the light receiver 120, to allow light having a wavelength of planar light to pass through the optical mechanism 121. In this case, light other than reflection light generated in accordance with reflection of planar light irradiated from the light emitter 110 by an obstacle may be removed.

The optical sensor 123 receives reflection light reflected from an obstacle, and thus generates an analog or digital signal. For example, as the optical sensor 123, an image sensor may be employed. The image sensor may include a photodiode sensor to detect an amount of reflection light, a complementary metal oxide semiconductor (MOS) image sensor to acquire an image based on reflection light or a charge coupled device (CCD) image sensor.

Reflection light reflected from an obstacle after being emitted from the light emitter 110 is incident upon the optical sensor 123 via the optical mechanism 121. The incident light is converted into an electrical image signal in the optical sensor 123.

When an image sensor is employed as the optical sensor 123, the light receiver 120 may further include an optical lens (not shown) arranged between the optical mechanism 121 and the optical sensor 123 while being spaced from the optical mechanism 121 by a predetermined distance, to allow reflection light to pass therethrough. In detail, the optical lens (not shown) condenses reflection light path-changed by the optical mechanism 121 so as to focus an image on the optical sensor 123. The optical lens (not shown) may be a convex lens.

The image processing circuit 124 may convert an analog signal received from the optical sensor 123 into a digital signal, and may convert the format of the signal. The image processing circuit 124 may include an analog/digital (A/D) converter (not shown) to convert an analog signal into a digital signal.

For example, when the above-described image sensor is employed as the optical sensor 123, the image processing circuit 124 may convert the format of an image acquired by the image sensor such that the converted format matches a desired appliance. The image processing circuit 124 may convert the format of the image into a particular format such as JPEG or MPEG in accordance with characteristics and requirements of the appliance (for example, the cleaning robot).

The obstacle sensing controller 130 may generate optical control signals to control turn-on/off of the light source 112, and may generate obstacle sensing information, based on an image signal applied to the obstacle sensing controller 130. For example, the obstacle sensing information may include the distance from the body to the sensed obstacle, the position of the obstacle, the height of the obstacle, the shape of the obstacle, a fall point, etc.

The obstacle sensing controller 130 may execute modulation of frequency, duty ratio, and intensity, based on the intensity of light received from the photo detector (not shown), and may transmit a control signal according to the modulation to the light source driver 113, for emission of light having a frequency, a duty ratio, and an intensity which are desired by the user. For example, the obstacle sensing controller 130 may control intensity of light through control such as pulse width modulation (PWM).

It is unnecessary for the obstacle sensing controller 130 to be a single module in which the obstacle sensing controller 130 is physically coupled with the light emitter 110 and light receiver 120. Other devices, to which the obstacle sensing module 100 may be mounted, such as a central processing unit (CPU) or a multipoint control unit (MCU), may be employed as the obstacle sensing controller 130.

The light source 112 of the obstacle sensing module 100 may generate planar light. Alternatively, the light emitter 110 may include a plurality of light sources 112 to generate planar light.

Hereinafter, a method of generating planar light in the obstacle sensing module 100 will be described.

Figure 3B:
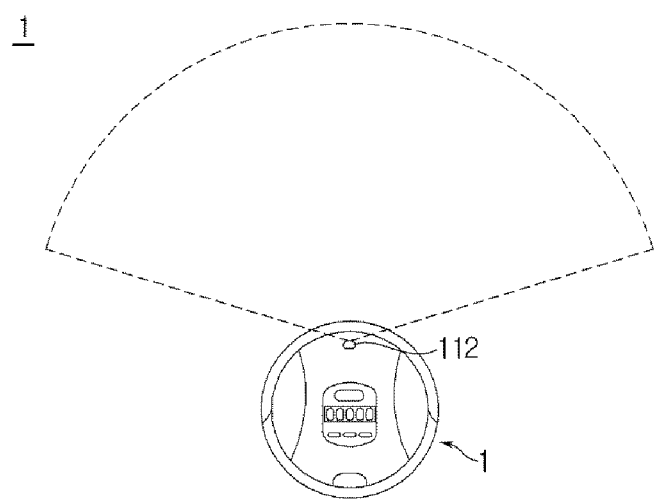
FIG. 3B is a view illustrating an example in which the obstacle sensing module generate planar light in accordance with an exemplary embodiment.
Figure 3C:
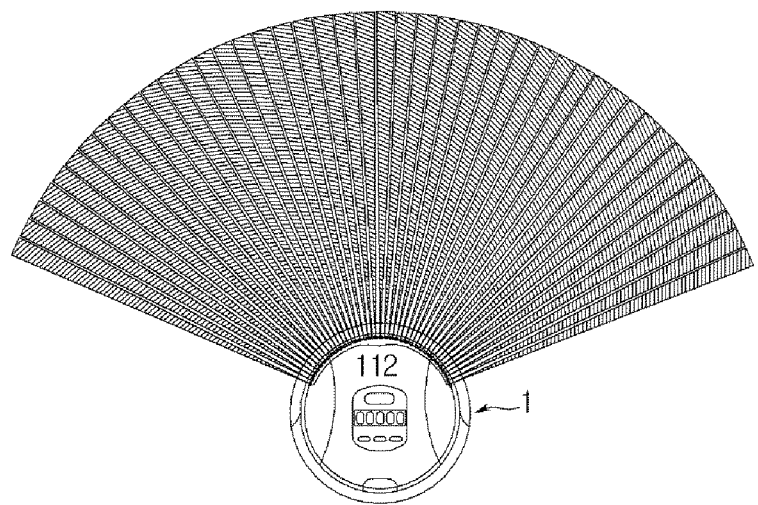
FIG. 3C is a view illustrating an example in which the obstacle sensing module generate planar light in accordance with an exemplary embodiment.

FIG. 3B is a view illustrating an example in which the obstacle sensing module generate planar light in accordance with an exemplary embodiment. FIG. 3C is a view illustrating an example in which the obstacle sensing module generate planar light in accordance with an exemplary embodiment.

Referring to FIG. 3B associated with the case in which the light emitter 110 includes a single light source 112 to generate planar light, the obstacle sensing module 100 may generate fan-shaped planar light by reflecting light irradiated from the light source 112 by a mirror or refracting the light through a lens. For example, the light emitter 110 may generate fan-shaped planar light, using a conical mirror to reflect incident light so as to widely diffuse the light or a wide-angle lens to refract incident light so as to widely diffuse the light.

On the other hand, referring to FIG. 3C associated with the case in which the light emitter 110 includes a plurality of light sources 112 to generate planar light, the light sources 112 are densely arranged at the front side of the cleaning robot 1 such that a plurality of beams irradiated from the light sources 112 overlap with one another, to form planar light.

Hereinafter, generation of fan-shaped or semicircular planar light from the obstacle sensing module 100 through refraction of light irradiated from the light source 112 using a wide-angle lens, as shown in FIG. 3B, will be described.

Figure 4A:
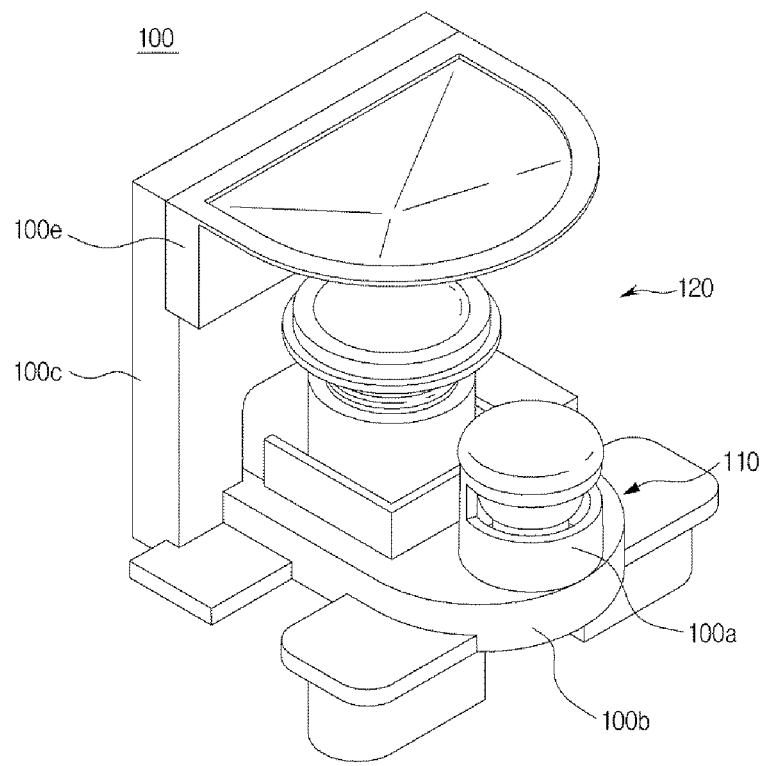
FIG. 4A is a view illustrating an outer configuration of the obstacle sensing module according to an exemplary embodiment.

FIG. 4A is a view illustrating an outer configuration of the obstacle sensing module according to an exemplary embodiment.

When one light emitter 110 and one light receiver 120 is integrally formed, they may be disposed on a stand 100b. In this case, the light emitter 110 may be in front of the light receiver 120. The light emitter 110 may be disposed within a light emitter housing 100a. The light receiver 120 may be coupled to a pillar 100c to support the light receiver 120 by a coupling member 100e.

Of course, the configuration illustrated in FIG. 4A is an example of the obstacle sensing module 100, and is not limited to that of FIG. 4A. That is, the light emitter 110 may be disposed beneath the stand 100b, and the light receiver 120 may be disposed above the stand 100b. Alternatively, the light emitter 110 and light receiver 120 may be disposed at the same position.

Of course, when the obstacle sensing module 100 is mounted to the robot 1, it is important to reduce the size of the obstacle sensing module 100 as much as possible. It may be possible to reduce the height of the obstacle sensing module 100 by arranging the light emitter 110 ahead of the light receiver 120. In this case, the light receiver 120 may be arranged at a level higher than that of the light emitter 110. Accordingly, even when the light emitter 110 is arranged ahead of the light receiver 120, reflection light reflected from an obstacle may be completely transmitted to the light receiver 120 without being shielded by the light emitter 110.

Although the obstacle sensing module includes an integrated structure of one light emitter and one light receiver in the illustrated case, the light emitter and light receiver may be separate from each other. Alternatively, the obstacle sensing module may include a plurality of light emitter or a plurality of light receiver. In other words, the light emitter and light receiver may be arranged at different positions such that they may be independently of each other.

Figure 4B:
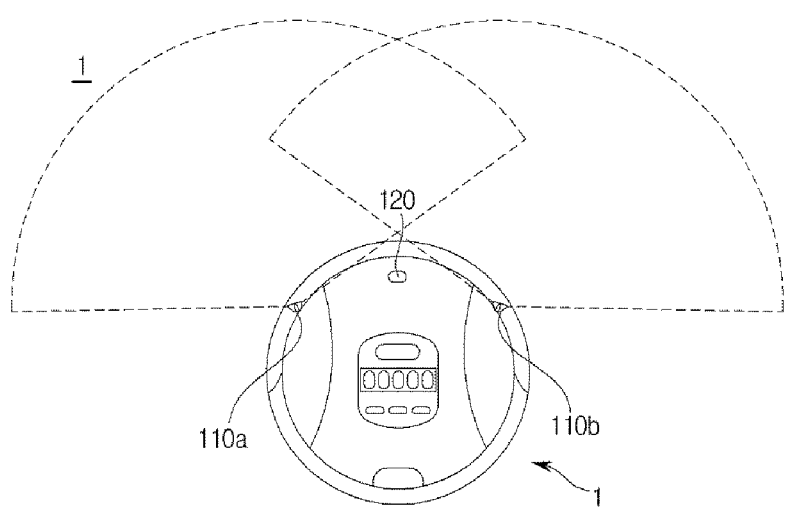
FIG. 4B is a view illustrating a view range of the cleaning robot when two light emitters included in the obstacle sensing module are mounted at different positions in accordance with exemplary an embodiment.

FIG. 4B is a view illustrating a view range of the cleaning robot when two light emitters included in the obstacle sensing module are mounted at different positions in accordance with an exemplary embodiment.

Referring to FIG. 4B, the obstacle sensing module 100 may include two light emitters 110a and 110b disposed at different positions, and one light receiver 120.

The two light emitters 110a and 110b may have different installation positions on the cleaning robot 1 or different levels from the floor.

In this case, it may be possible to sense obstacles arranged at various levels by arranging the plural light emitters 110a and 110b at different levels or arranging the plural light emitters 110a and 110b to be inclined. When the light emitters 110a and 110b and the light receiver 120 are arranged at different positions without being vertically aligned, it may be possible to sense obstacles arranged at various levels without increasing the height of the obstacle sensing module 100.

Figure 4C:
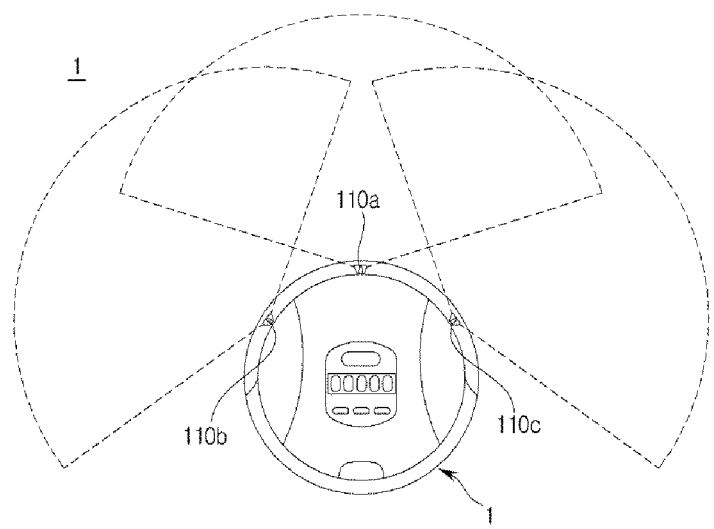
FIG. 4C is a view illustrating a view range of the cleaning robot when the obstacle sensing module includes three light emitters in accordance with an exemplary embodiment.

FIG. 4C is a view illustrating a view range of the cleaning robot when the obstacle sensing module includes three light emitters in accordance with an exemplary embodiment.

Referring to FIG. 4C, the obstacle sensing module 100 may include three light emitters 110a, 110b, and 110c arranged at different positions on the cleaning robot 1. When three light emitters 110a, 110b, and 110c capable of diffusing planar light of 120° are employed, it may be possible to obtain the same effect as that of the case in which a single light emitter capable of diffusing planar light of 220° is employed.

In this case, the first light emitter 110a may be installed ahead of the light receiver installed at the front side of the robot 1 while being arranged to forwardly diffuse planar light. The second light emitter 110b is installed to be spaced from the first light emitter 110a in a left direction by a predetermined distance while being arranged to diffuse planar light in a direction forming a predetermined angle from the front side of the robot 1. On the other hand, the third light emitter 110c is installed to be spaced from the first light emitter 110a in a right direction by a predetermined distance while being arranged to diffuse planar light in a direction forming a predetermined angle from the front side of the robot 1.

In this case, the planar light diffusion zones of the first light emitter 110a, second light emitter 110b, and third light emitter 110c may partially overlap with one another. In addition, the first light emitter 110a, second light emitter 110b, and third light emitter 110c may be arranged to minimize a dead zone that may not be sensed by the robot 1, taking into consideration the positional characteristics of the first light emitter 110a, second light emitter 110b, and third light emitter 110c.

Figure 4D:
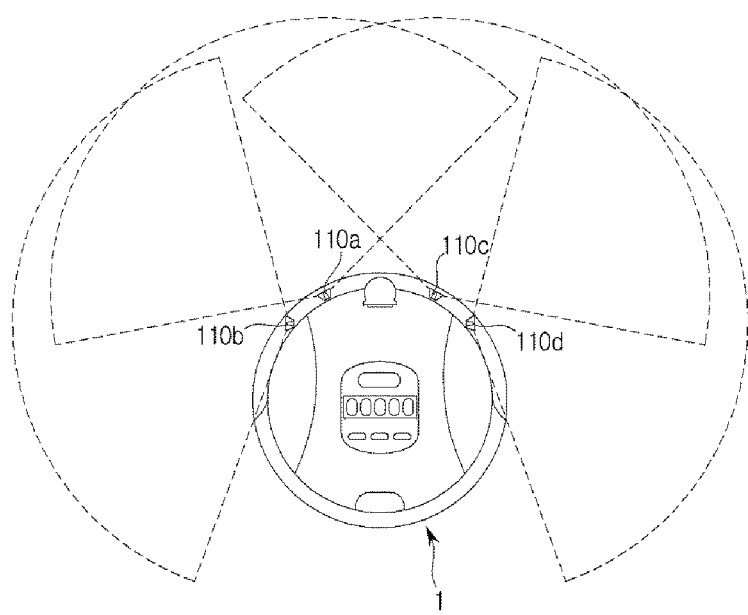
FIG. 4D is a view illustrating a view range of the cleaning robot when the obstacle sensing module includes four light emitters in accordance with an exemplary embodiment.

FIG. 4D is a view illustrating a view range of the cleaning robot when the obstacle sensing module includes four light emitters in accordance with an exemplary embodiment.

Referring to FIG. 4D, four light emitters 110a, 110b, 110c, and 110d arranged at different positions on the robot 1 are illustrated. When four light emitters 110a, 110b, 110c, and 110d capable of diffusing planar light of 120° are employed, it may be possible to diffuse planar light over a wider zone than that of the case in which a single light emitter capable of diffusing planar light of 220° is employed.

In this case, a pair of light emitters, namely, the first light emitter 110a and second light emitter 110b, are installed to be spaced from the light receiver 120 installed at the front side of the robot 1 in a left direction by a predetermined distance while being directed in different directions forming a predetermined angle therebetween. Another pair of light emitters, namely, the third light emitter 110c and fourth light emitter 110d, are installed to be spaced from the light receiver 120 installed at the front side of the robot 1 in a right direction by a predetermined distance while being directed in different directions forming a predetermined angle therebetween.

In this case, the first light emitter 110a and second light emitter 110b may diffuse planar light in forward and left directions of the robot 1, respectively. On the other hand, the third light emitter 110c and fourth light emitter 110d may diffuse planar light in forward and right directions of the robot 1, respectively. In this case, the planar light diffusion zones of the first light emitter 110a, second light emitter 110b, third light emitter 110c, and fourth light emitter 110d may partially overlap with one another. In addition, the first light emitter 110a, second light emitter 110b, third light emitter 110c, and fourth light emitter 110d may be arranged to minimize a dead zone that may not be sensed by the robot 1, taking into consideration the positional characteristics of the first light emitter 110a, second light emitter 110b, third light emitter 110c, and fourth light emitter 110d.

The obstacle sensing module 100 may sense obstacles present around the robot 1 by generating uniform planar light.

The robot 1 equipped with the obstacle sensing module 100 may achieve more effective cleaning and travel in accordance with sensing of obstacles present therearound and utilization of the sensed results in driving control.

Hereinafter, the light receiver will be described in detail.

For better understanding of the light receiver, the following description will be given in conjunction with the case in which, as the optical mechanism ("121" in FIG. 3A), a reflection mirror is employed to reflect, toward the optical sensor ("123" in FIG. 3A), reflection light reflected by an obstacle.

In addition, the light receiver will be described in conjunction with the case in which the light receiver employs an image sensor and the case in which the light receiver employs a photodiode. First, the light receiver which employs an image sensor will be described.

Figure 5A:
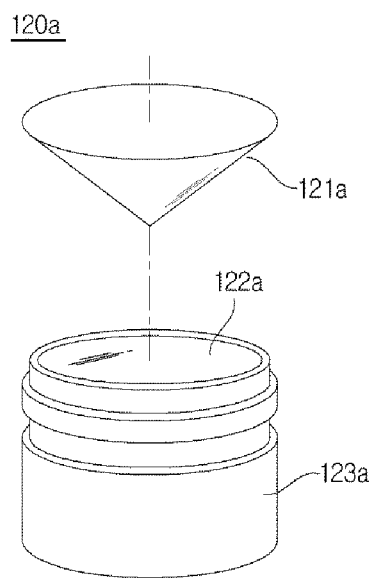
FIG. 5A is a view illustrating a light receiver included in the obstacle sensing module in accordance with an exemplary embodiment and an image acquired by the light receiver.
Figure 5A:
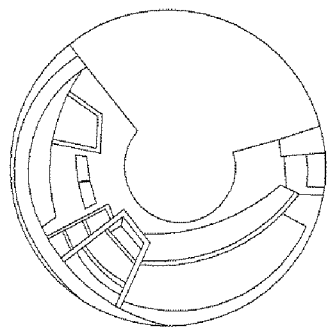

FIG. 5A is a view illustrating a light receiver included in the obstacle sensing module in accordance with an exemplary embodiment and an image acquired by the light receiver.

As illustrated in FIG. 5A(a), the light receiver which is designated by reference numeral "120a" includes a reflection mirror 121a to change a path of reflection light reflected from an obstacle such that the reflection light is directed to an image sensor 123a, and an optical lens 122b to condense the reflection light path-changed by the reflection mirror 121a. The light receiver further includes an image sensor 123a to receive the reflection light condensed by the optical lens 122b.

As the reflection mirror 121a, a conical mirror may be employed in order to change a path of reflection light incident upon the mirror in various directions toward the image sensor 123a. The reflection mirror 121a may be arranged over the image sensor 123a while extending vertically downwardly such that an apex of the conical reflection mirror downwardly faces the image sensor 123a. Alternatively, although not shown, the reflection mirror 121 may be a conical mirror arranged beneath the image sensor 123a while extending vertically upwardly such that an apex of the conical reflection mirror upwardly faces the image sensor 123a. Of course, the shape of the reflection mirror 121a is not limited to the conical shape.

The reflection mirror 121a may be made of a metal such as aluminum or may be formed of a plastic body and chromium (Cr) plated over the plastic body in order to achieve an enhancement in reflectance of the surface of the reflection mirror 121a and, as such, may reflect reflection light reflected from an obstacle to the image sensor 123a without distortion.

When a conical mirror is employed as the reflection mirror 121a, the image sensor 123a may acquire an image as illustrated in FIG. 5A(b). In detail, at a central portion of an image acquired by the image sensor 123a, there is no image associated with an obstacle due to blocking of reflection light by the body of the cleaning robot. The acquired image includes an image associated with the obstacle while being arranged in a range from a position spaced in a radial direction from the center of the acquired image. The image of an obstacle disposed at a position near to the body of the cleaning robot while being spaced from the floor of the cleaning space by a small height is arranged at a position near to the center of the acquired image. On the other hand, the image of an obstacle disposed at a position far from the body of the cleaning robot while being spaced from the floor of the cleaning space by a great height is arranged at a position near to the periphery of the acquired image. In other words, the image of an obstacle nearer to the cleaning robot is arranged at a position nearer to the center of the image acquired by the image sensor 123a, whereas the image of an obstacle farther from the cleaning robot is arranged at a position farther from the center of the image acquired by the image sensor 123a.

Hereinafter, various conical shapes of the reflection mirror 121a will be illustrated, and view ranges of the cleaning robot associated with respective conical shapes of the reflection mirror 121a and obstacle images acquired by the image sensor 123a in association with respective conical shapes of the reflection mirror 121a will be described.

Figure 5B:
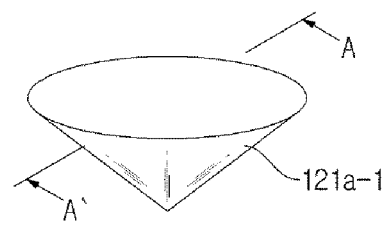
FIG. 5B is a view illustrating a first example of the reflection mirror included in an example of the light receiver of the obstacle sensing module according to an exemplary embodiment and an image acquired by the reflection mirror.
Figure 5B:
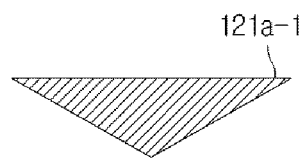
Figure 5B:
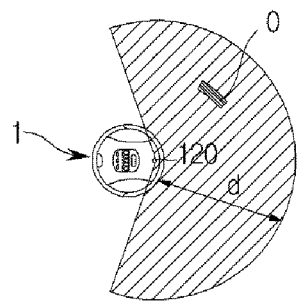
Figure 5B:
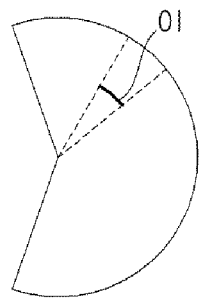

FIG. 5B is a view illustrating a first example of the reflection mirror included in an example of the light receiver of the obstacle sensing module according to an exemplary embodiment and an image acquired by the reflection mirror.

Referring to FIG. 5B, the reflection mirror which is designated by reference numeral "121a-1" has a general conical shape as illustrated in FIG. 5B(a).

The cross-section of the reflection mirror 121a-1 taken along the line A-A' of FIG. 5B(a) has a triangular shape as illustrated in FIG. 5B(b).

The cleaning robot 1 employing the reflection mirror 121a-1 having the above-described conical shape has a fan-shaped view range as illustrated in FIG. 5B(c). In detail, the cleaning robot 1 may have a view angle of 100 to 150° in left and right directions with regard to the front side of the cleaning robot 1 where the light receiver 120a including the reflection mirror 121a-1 is disposed. In other words, the cleaning robot 1 may totally have a view angle of 200 to 300°. Since the body of the cleaning robot 1 blocks the field of view of the light receiver 121a, it may be impossible to secure a view angle of 360°. The view angle of the cleaning robot 1 may be varied in accordance with the position of the light receiver 121a. For example, when the light receiver 121a is provided to be protruded from the body of the cleaning robot 1, a wide view angle may be secured. On the other hand, when the light receiver 121a is disposed inside the body of the cleaning robot 1, the view angle may be narrowed.

In addition, the cleaning robot 1 may secure a predetermined view distance d. The view distance d of the cleaning robot 1 may be varied in accordance with the resolution of the image sensor 123a, the material of the reflection mirror 121a-1, and the shape of the reflection mirror 121a-1, namely, the angle of side surface of the conical shape.

The image sensor 123a included in the cleaning robot 1 employing the reflection mirror 121a-1 may acquire a fan-shaped image as illustrated in FIG. 5B(d). In detail, as illustrated in FIG. 5B(d), it may be possible to acquire an image having a shape similar to that of the view range of the cleaning robot 1. It may also be possible to acquire a bright obstacle image formed at a position corresponding to the position of an obstacle. For example, when an obstacle is disposed at a position slightly biased toward a left direction in front of the cleaning robot 1, as illustrated in FIG. 5B(c), the image sensor 123a may acquire an obstacle image OI having a bright arc shape at a position slightly biased toward a left direction in front of the cleaning robot 1. As will be described later, based on the position of the acquired obstacle image OI, the cleaning robot 1 may determine presence of an obstacle O and the position of the obstacle O.

Figure 5C:
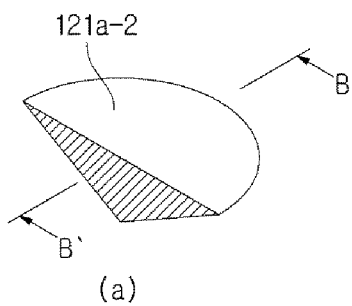
FIG. 5C is a view illustrating a second example of the reflection mirror included in an example of the light receiver of the obstacle sensing module according to an exemplary embodiment and an image acquired by the reflection mirror.
Figure 5C:
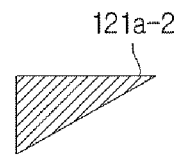
Figure 5C:
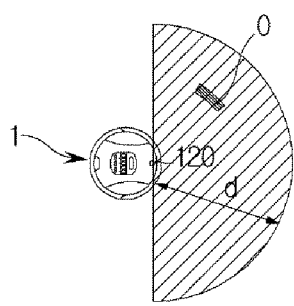
Figure 5C:
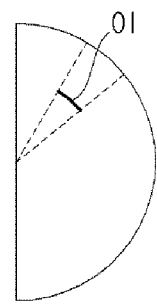

FIG. 5C is a view illustrating a second example of the reflection mirror included in an example of the light receiver of the obstacle sensing module according to an exemplary embodiment and an image acquired by the reflection mirror.

Referring to FIG. 5C, the reflection mirror which is designated by reference numeral "121a-2" has a shape formed by vertically truncating a conical shape from a bottom of the conical shape (hereinafter, referred to as a vertically-truncated conical shape"), as illustrated in FIG. 5C(a).

The cross-section of the reflection mirror 121a-2 taken along the line B-B' of FIG. 5C(a) has a right-angled triangular shape as illustrated in FIG. 5C(b).

The cleaning robot 1 employing the reflection mirror 121a-2 having the vertically-truncated conical shape has a semicircular view range as illustrated in FIG. 5C(c).

In detail, the cleaning robot 1 may have a view angle of 90° in left and right directions with regard to the front side of the cleaning robot 1 where the light receiver 120a is disposed. In other words, the cleaning robot 1 may totally have a view angle of 180°. This is because reflection light is only incident upon the side surface of the conical shape, and no reflection light is incident upon a rear surface of the reflection mirror 121a-2.

In addition, the cleaning robot 1 may secure a predetermined view distance d. As described above, the view distance d of the cleaning robot 1 may be varied in accordance with the resolution of the image sensor 123a, the material of the reflection mirror 121a-2, and the shape of the reflection mirror 121a-2, namely, the angle of side surface of the conical shape.

The image sensor 123a included in the cleaning robot 1 employing the reflection mirror 121a-2 may acquire a semi-circular image as illustrated in FIG. 5C(d).

In detail, as illustrated in FIG. 5C(d), it may be possible to acquire an image having a shape similar to that of the view range of the cleaning robot 1. It may also be possible to acquire a bright obstacle image formed at a position corresponding to the position of an obstacle. For example, when an obstacle is disposed at a position slightly biased toward a left direction in front of the cleaning robot 1, as illustrated in FIG. 5C(c), the image sensor 123a may acquire an obstacle image OI having a bright arc shape at a position slightly biased toward a left direction in front of the cleaning robot 1.

Figure 5D:
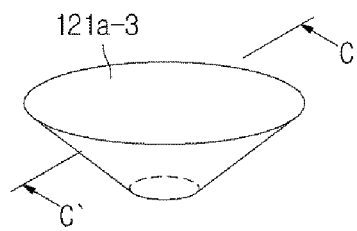
FIG. 5D is a view illustrating a third example of the reflection mirror included in an example of the light receiver of the obstacle sensing module according to an exemplary embodiment and an image acquired by the reflection mirror.
Figure 5D:
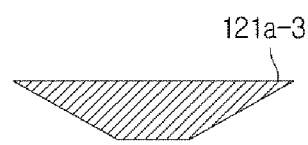
Figure 5D:
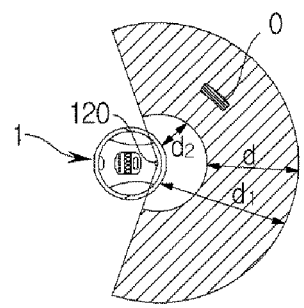
Figure 5D:
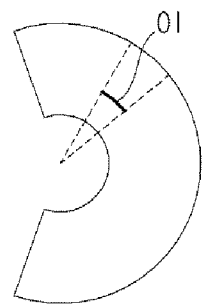

FIG. 5D is a view illustrating a third example of the reflection mirror included in an example of the light receiver of the obstacle sensing module according to an exemplary embodiment and an image acquired by the reflection mirror.

Referring to FIG. 5D, the reflection mirror which is designated by reference numeral "121a-3" has a shape formed by horizontally truncating a conical shape from a bottom of the conical shape (hereinafter, referred to as a horizontally-truncated conical shape"), as illustrated in FIG. 5D(a).

The cross-section of the reflection mirror 121a-3 taken along the line C-C' of FIG. 5D(a) has a horizontally-truncated conical shape as illustrated in FIG. 5D(b).

The cleaning robot 1 employing the reflection mirror 121a-3 having the horizontally-truncated conical shape has a cut donut-shaped view range as illustrated in FIG. 5D(c). That is, a region very near to the cleaning robot 1 is not included in the view range of the cleaning robot 1.

In detail, the cleaning robot 1 may have a view angle of 100 to 150° in left and right directions with regard to the front side of the cleaning robot 1 where the light receiver 120a is disposed. In other words, the cleaning robot 1 may totally have a view angle of 200 to 300°. Since the body of the cleaning robot 1 blocks the field of view of the light receiver 121a, it may be impossible to secure a view angle of 360°.

In addition, the cleaning robot 1 may secure a predetermined view distance d. That is, the cleaning robot 1 has a view distance range between a view distance d1 corresponding to a length of the side surface of the conical shape and a view distance d2 corresponding to a length of the side surface of the cut portion of the conical shape. In other words, the cleaning robot 1 has a view range from to a first distance d1 to a second distance d2. This is because reflection light is incident upon the side surface of the reflection mirror 121a-3, whereas no reflection light is incident upon a cut bottom surface of the reflection mirror 121a-3. The view distance d of the cleaning robot 1 may be varied in accordance with the resolution of the image sensor 123a, the material of the reflection mirror 121a, and the shape of the reflection mirror 121a-3, namely, the angle of side surface of the conical shape.

The image sensor 123a included in the cleaning robot 1 employing the reflection mirror 121a-3 may acquire a cut donut-shaped image as illustrated in FIG. 5D(d).

Figure 5E:
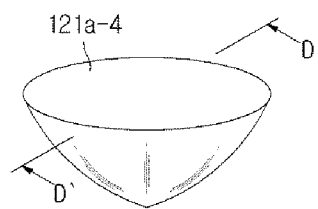
FIG. 5E is a view illustrating a fourth example of the reflection mirror included in an example of the light receiver of the obstacle sensing module according to an exemplary embodiment and an image acquired by the reflection mirror.
Figure 5E:
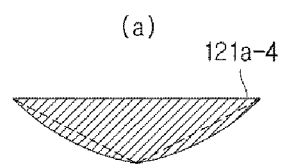
Figure 5E:
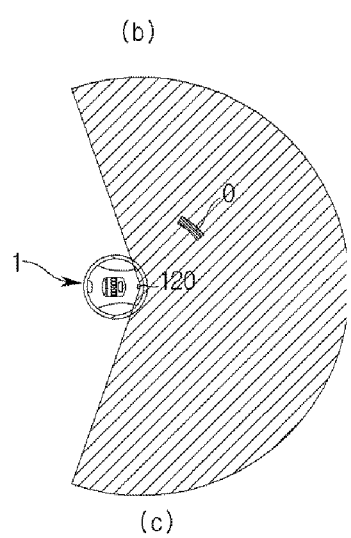
Figure 5E:
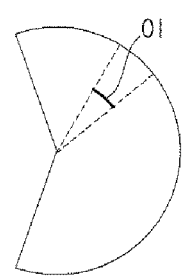

FIG. 5E is a view illustrating a fourth example of the reflection mirror included in an example of the light receiver of the obstacle sensing module according to an exemplary embodiment and an image acquired by the reflection mirror.

Referring to FIG. 5E, the reflection mirror which is designated by reference numeral "121a-4" has a conical shape having a convex side surface (hereinafter, referred to as a convex conical shape"), as illustrated in FIG. 5E(a).

The cross-section of the reflection mirror 121a-4 taken along the line D-D' of FIG. 5E(a) has a convex conical shape as illustrated in FIG. 5E(b).

The cleaning robot 1 employing the reflection mirror 121a-4 having the convex conical shape has a fan-shaped view range as illustrated in FIG. 5E(c). In detail, the cleaning robot 1 may have a view angle of 100 to 150° in left and right directions with regard to the front side of the cleaning robot 1 where the light receiver 120a including the reflection mirror 121a-4 is disposed. In other words, the cleaning robot 1 may totally have a view angle of 200 to 300°. Since the body of the cleaning robot 1 blocks the field of view of the light receiver 121a, it may be impossible to secure a view angle of 360°.

In addition, the cleaning robot 1 may secure a predetermined view distance d. The view distance d of the reflection mirror 121a-4 having the above-described convex conical shape is long, as compared to the reflection mirror ("121a-1" in FIG. 5B) having the above-described general conical shape, as in the case of a convex mirror having a wider view range than a flat mirror.

The image sensor 123a included in the cleaning robot 1 employing the reflection mirror 121a-4 may acquire a fan-shaped image as illustrated in FIG. 5E(d). Since the reflection mirror 121a-4 having the above-described convex conical shape has a wider view range than the reflection mirror ("121a-1" in FIG. 5B) having the above-described general conical shape, the image acquired by the convex conical reflection mirror 121a-4 may include obstacle information of a wider cleaning space than that of the image acquired by the general conical reflection mirror ("121a-1" in FIG. 5B).

Figure 5F:
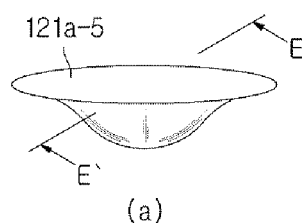
FIG. 5F is a view illustrating a fifth example of the reflection mirror included in an example of the light receiver of the obstacle sensing module according to an exemplary embodiment and an image acquired by the reflection mirror.
Figure 5F:
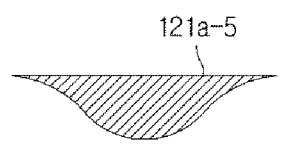
Figure 5F:
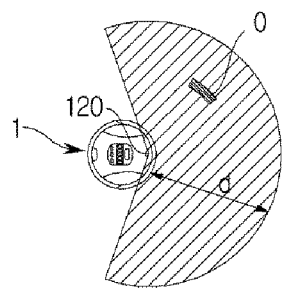
Figure 5F:
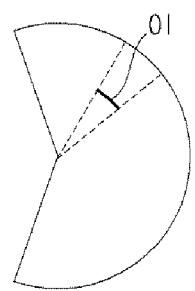

FIG. 5F is a view illustrating a fifth example of the reflection mirror included in an example of the light receiver of the obstacle sensing module according to an exemplary embodiment and an image acquired by the reflection mirror.

Referring to FIG. 5F, the reflection mirror which is designated by reference numeral "121a-5" has a conical structure having a convex side surface portion extending from an apex of the conical structure to a predetermined height and a concave side surface portion extending from the predetermined height to a bottom of the conical structure, as illustrated in FIG. 5F(a).

The cross-section of the reflection mirror 121a-5 taken along the line E-E' of FIG. 5F(a) has a convex conical shape as illustrated in FIG. 5F(b).

As illustrated in FIG. 5F(c), the cleaning robot 1 employing the reflection mirror 121a-5 may have a view angle of 200 to 300°. Since the body of the cleaning robot 1 blocks the field of view of the light receiver 121a, it may be impossible to secure a view angle of 360°.

In addition, the cleaning robot 1 may secure a predetermined view distance d.

The image sensor 123a included in the cleaning robot 1 employing the reflection mirror 121a-5 may acquire a fan-shaped image as illustrated in FIG. 5F(d)

Heretofore, examples of the light receiver employing the image sensor have been described. Hereinafter, examples of the light receiver employing the photodiode will be described.

Figure 6A:
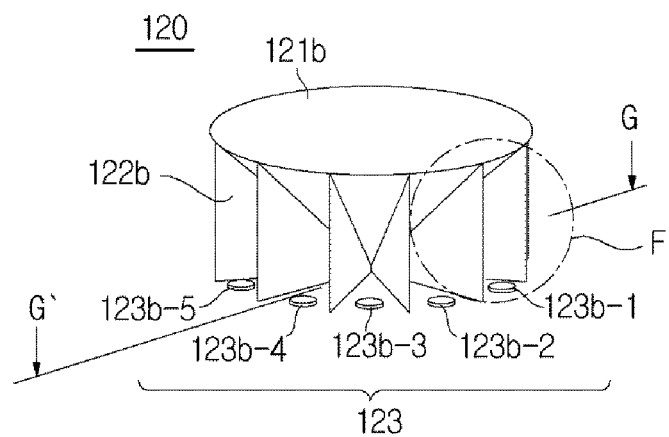
FIG. 6A is a view illustrating another example of the light receiver of the obstacle sensing module according to exemplary an embodiment.
Figure 6B:
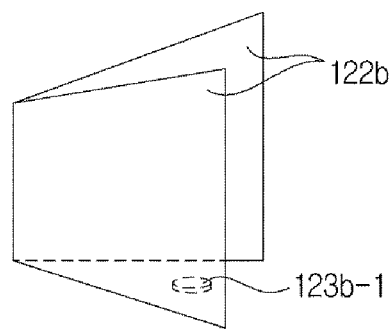
FIG. 6B is a view corresponding to a region A of FIG. 6A.
Figure 6C:
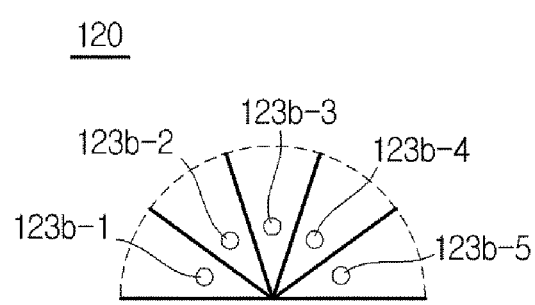
FIG. 6C is a cross-sectional view taken along the line B-B' of FIG. 6A.
Figure 6D:
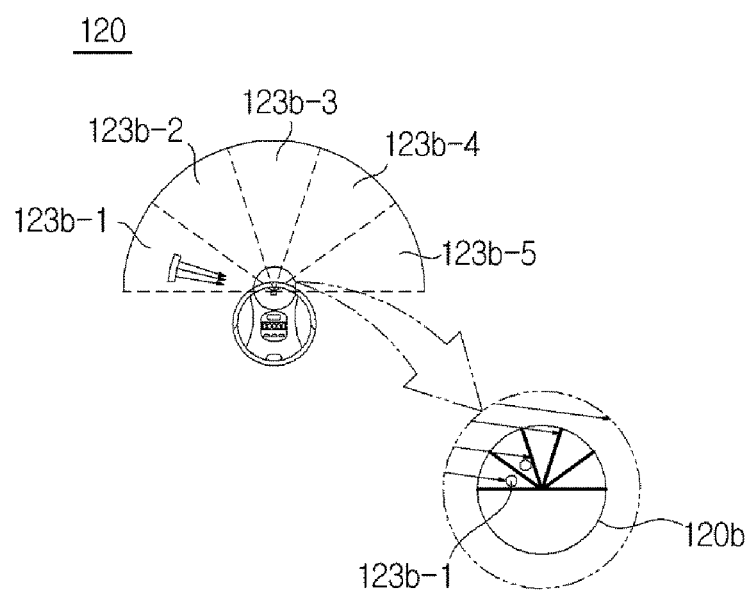
FIG. 6D is a view illustrating a view range of the cleaning robot including the example of the light receiver according to the exemplary embodiment of FIG. 6A.

FIG. 6A is a view illustrating another example of the light receiver of the obstacle sensing module according to an exemplary embodiment. FIG. 6B is a view corresponding to a region A of FIG. 6A. FIG. 6C is a cross-sectional view taken along the line B-B' of FIG. 6A. FIG. 6D is a view illustrating a view range of the cleaning robot including the example of the light receiver according to the embodiment of FIG. 6A.

Referring to FIGS. 6A to 6D, the light receiver 120 includes a reflection mirror 121b to change a path of reflection light reflected from an obstacle, a plurality of shields 122b to divide the reflection mirror 121b into a plurality of reflection regions 121b-1, 121b-2, 121b-3, 121b-4, and 121b-5, and a plurality of photodiodes 123b provided to respectively correspond to the reflection regions 121b-1, 121b-2, 121b-3, 121b-4, and 121b-5 divided by the shields 122b.

As the reflection mirror 121b, a conical mirror may be employed in order to change a path of reflection light incident upon the mirror in various directions toward the image sensor 123a. FIGS. 6A to 6D illustrate conical mirrors as the reflection mirror 121b. However, the reflection mirror 121b is not limited to the illustrated cases. The reflection mirror 121b may have various shapes as illustrated in FIGS. 5B to 5F.

The shields 122b divide the reflection mirror 121b into a plurality of reflection regions. In addition, the cleaning robot 1 has a field of view v123b divided into a plurality of view field regions v120b-1, v120b-2, v120b-3, v120b-4, and v120b-5. Each shield 122b blocks reflection light incident upon reflection regions which do not correspond to a corresponding one of the view field regions. For example, the shields 122b corresponding to the first view field region v120b-1 allow reflection light reflected from an obstacle O in the first view filed portion v120b-1 to be incident upon the first reflection region 121b-1 of FIG. 6A while preventing reflection light reflected in the second to fifth view field regions v120b-2 to v120b-5 from being incident upon the first reflection region 121b-1.

Each shield 122b may have a trapezoidal shape such that it may correspond to the side surface of the reflection mirror 121b, as illustrated in FIG. 6B. Each shield 122b may employ a material capable of effectively absorbing light in order to shield reflection light incident from view field regions other than the corresponding view field region.

A plurality of photodiodes 123b-1, 123b-2, 123b-3, 123b-4, and 123b-5 are provided to correspond to respective reflection regions 121b-1, 121b-2, 121b-3, 121b-4, and 121b-5. The photodiodes 123b-1, 123b-2, 123b-3, 123b-4, and 123b-5 detect reflection light reflected from respective reflection regions 121b-1, 121b-2, 121b-3, 121b-4, and 121b-5. For example, the first photodiode 123b-1 detects an amount of reflection light path-changed by a first reflection region 121b-1 of the reflection mirror 121b after being reflected by an obstacle disposed in the first view field region v120b-1.

Hereinafter, determination of a direction of an obstacle by the cleaning robot 1 will be described. The cleaning robot 1 may determine a direction of an obstacle, based on one of the photodiodes 123b which has detected reflection light.

For example, as illustrated in FIG. 6D, the cleaning robot 1 emits planar light, and the planar light is then reflected by an obstacle O disposed in the first view field region v120-1. The reflection light reflected by the obstacle O is incident upon the reflection mirror 121b of the light receiver 120b.

In this case, the reflection light is not only incident upon the first reflection region 121b-1 corresponding to the first view field region v120b-1, but also incident upon the second reflection region 121b-2 to fifth reflection region 121b-5. However, the reflection light incident upon the second reflection region 121b-2 to fifth reflection region 121b-5 is blocked by the shields 122b corresponding to the first reflection region 121b-1. Accordingly, only the reflection light incident upon the first reflection region 121b-1 is reflected from the reflection mirror 121b, and is then incident upon the first photodiode 123b-1. As a result, the reflection light reflected by the obstacle O disposed in the first view field region v120-1 is detected only by the first photodiode 123b-1.

When the first photodiode 123b-1 detects reflection light, the cleaning robot 1 may determine that an obstacle O is present in the first view field region v120b-1.

Hereinafter, determination of a distance to an obstacle by the cleaning robot 1 will be described. The distance to the obstacle is determined, based on an amount of light detected by the photodiode 123b of the cleaning robot 1.

Figure 6E:
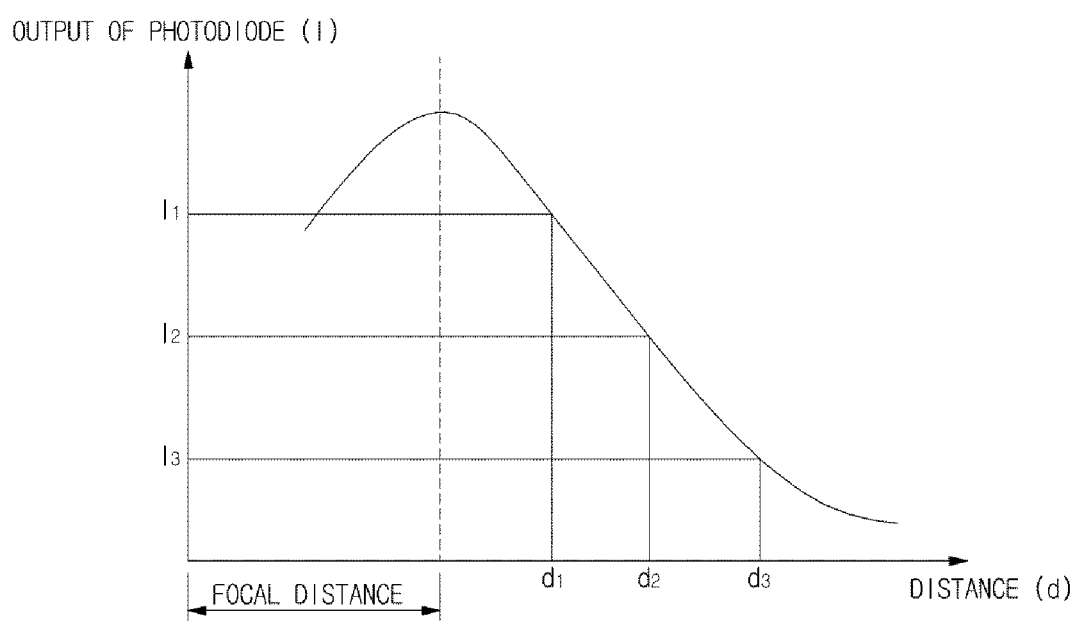
FIG. 6E is a graph explaining determination of a distance to an obstacle by the cleaning robot which includes another example of the light receiver of the obstacle sensing module according to an exemplary embodiment.

FIG. 6E is a graph explaining determination of a distance to an obstacle by the cleaning robot which includes another example of the light receiver of the obstacle sensing module according to an exemplary embodiment.

An output I of the photodiode 123b according to a distance d to an obstacle is illustrated in FIG. 6E. In detail, when the obstacle distance d is shorter than a predetermined focal distance, the output I of the photodiode 123b is gradually increased in accordance with an increase in the obstacle distance d. On the other hand, when the obstacle distance d is longer than the predetermined focal distance, the output I of the photodiode 123b is gradually decreased in accordance with an increase in the obstacle distance d.

Such a phenomenon is caused by the characteristics of the obstacle sensing module which utilizes light. The light emitter emits light under the condition that the light is focused at a position spaced from the light emitter by a predetermined distance, in order to achieve an enhancement in the sensitivity to an obstacle disposed at a position spaced from the light emitter by the predetermined distance. In this case, the light receiver outputs a maximum output value in response to light reflected from the obstacle disposed at the position spaced from the light emitter by the predetermined distance. Accordingly, when the photodiode 123b outputs a maximum output value when the obstacle is disposed at a position spaced from the light emitter by a focal distance. When the obstacle is disposed at a position spaced from the light emitter by a distance shorter or longer than the focal distance, the output value of the photodiode 123b is reduced. By virtue of such characteristics of the obstacle sensing module utilizing light, it may be possible to ignore a shorter distance than the focal distance by arranging the photodiode 123b at a position spaced in a rearward direction from the foremost portion of the cleaning robot 1 by the focal distance.

The cleaning robot 1 may determine the distance d to the obstacle, based on the output I of the photodiode 123b according to the obstacle distance d as illustrated in FIG. 6E. For example, when the output of the photodiode 123b has a first output value I1, the cleaning robot 1 may determine the obstacle distance to be a first distance d1. When the output of the photodiode 123b has a second output value I2, the cleaning robot 1 may determine the obstacle distance to be a second distance d2. On the other hand when the output of the photodiode 123b has a third output value I1, the cleaning robot 1 may determine the obstacle distance to be a third distance d3.

In brief, when the cleaning robot includes a light receiver employing a plurality of photodiodes, it may determine the direction of an obstacle, based on one of the photodiodes which has detected reflection light, and may determine the distance to the obstacle, based on an output value from the photodiode.

Heretofore, the light receiver of the obstacle sensing module has been described.

Hereinafter, the light emitter of the obstacle sensing module will be described.

Figure 7A:
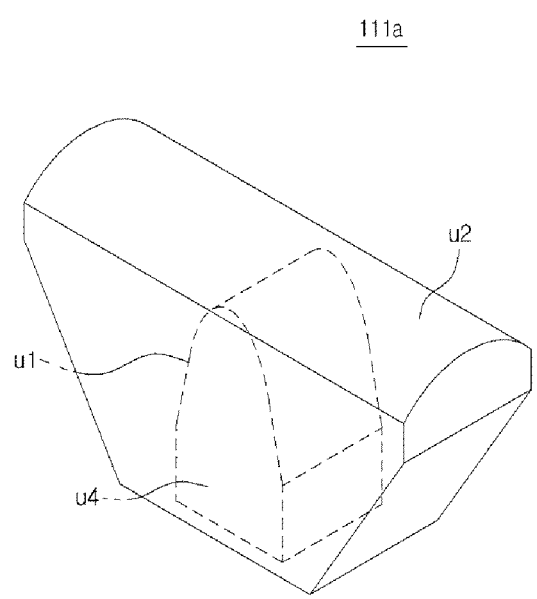
FIG. 7A is a view illustrating a first example of a wide-angle lens included in the obstacle sensing module in accordance with exemplary an embodiment.
Figure 7B:
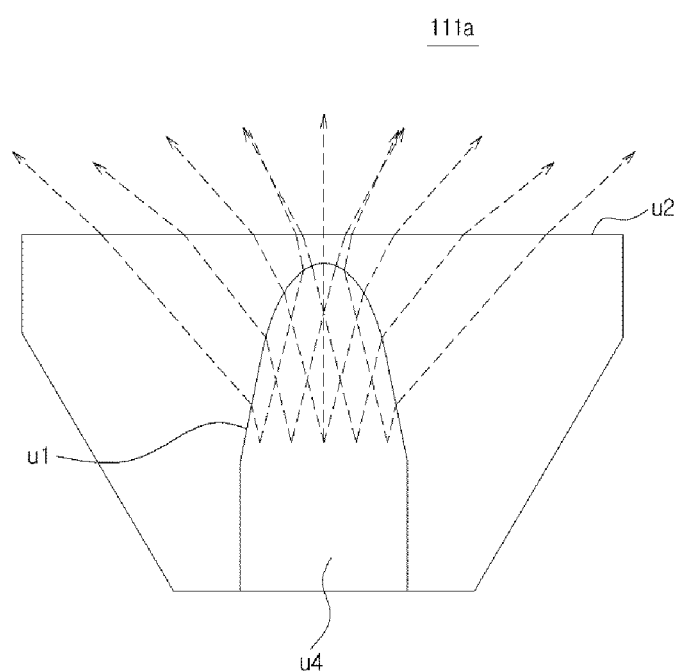
FIG. 7B is a view illustrating diffusion of planar light emerging from the first example of the wide-angle lens included in the obstacle sensing module in accordance with an exemplary embodiment.

FIG. 7A is a view illustrating a first example of a wide-angle lens included in the obstacle sensing module in accordance with an exemplary embodiment. FIG. 7B is a view illustrating diffusion of planar light emerging from the first example of the wide-angle lens included in the obstacle sensing module in accordance with an exemplary embodiment.

Referring to FIGS. 7A and 7B, the first wide-angle lens which is designated by reference numeral "111a" may include a transparent member allowing light incident from a light source (not shown) thereupon to pass therethrough.

The first wide-angle lens 111a may include a first diffusion surface u1 to refract light incident from the light source so as to diffuse the incident light within the first wide-angle lens 111a, a second diffusion surface u2 to refract the light refracted by the first diffusion surface u1 outwardly of the first wide-angle lens 111a so as to generate planar light, and a holding recess u4 formed at a surface opposite to the first diffusion surface u1, to hold the light source received therein.

For example, the first wide-angle lens 111a may include diffusion of planar light over an angle of 120°. In this case, the second diffusion surface u2 of the first wide-angle lens 111a may have a convex shape in order to thin planar light diffused in the first wide-angle lens 111a.

Hereinafter, the path of light in the first wide-angle lens 111a will be described. First, light emitted from the light source is refracted by the first diffusion surface u1 of the first wide-angle lens 111a. The refracted light is then diffused within the first wide-angle lens 111a.

The light, which is diffused in various directions while passing through the first diffusion surface u1, is again diffused in various directions while passing through the second diffusion surface u2. That is, the light is converted into planar light.

The above-described first wide-angle lens 111a may have a shape illustrated in FIG. 7A. Of course, the first wide-angle lens 111a is not limited to the illustrated shape.

Figure 7C:
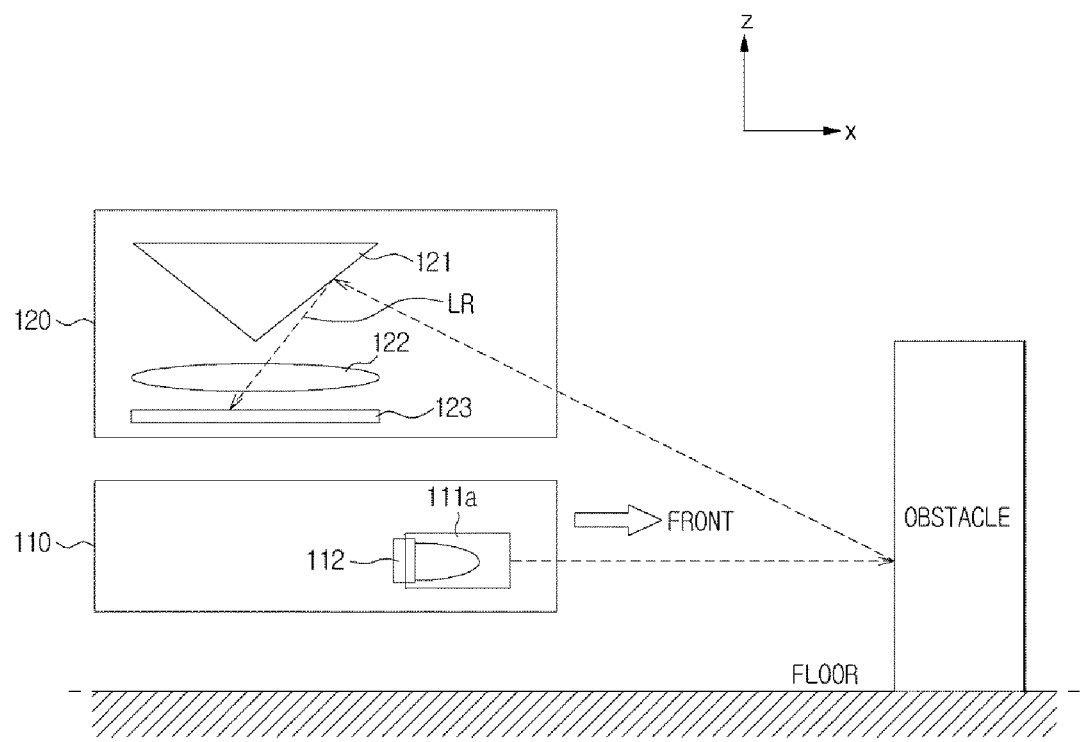
FIG. 7C is a view illustrating a state in which the first wide-angle lens according to an exemplary embodiment is installed at the obstacle sensing module.

FIG. 7C is a view illustrating a state in which the first wide-angle lens according to an exemplary embodiment is installed at the obstacle sensing module.

Referring to FIG. 7C, the light source 112 of the light emitter 110 emits light in a direction parallel to the floor.

The first wide-angle lens 111a may forwardly diffuse planar light generated in accordance with refraction or reflection of light emitted from the light source 112. Such planar light may be irradiated in a direction parallel to the floor or in a direction inclined from the floor.

As a result, the obstacle sensing module may sense an obstacle disposed at a higher or lower level than that of an obstacle disposed on the floor.

The planar light may be reflected by an obstacle, and the reflected light may be again reflected after being transmitted to the reflection mirror 121.

Reflection light reflected by the reflection mirror 121 may be transmitted to the optical sensor 123.

Figure 7D:
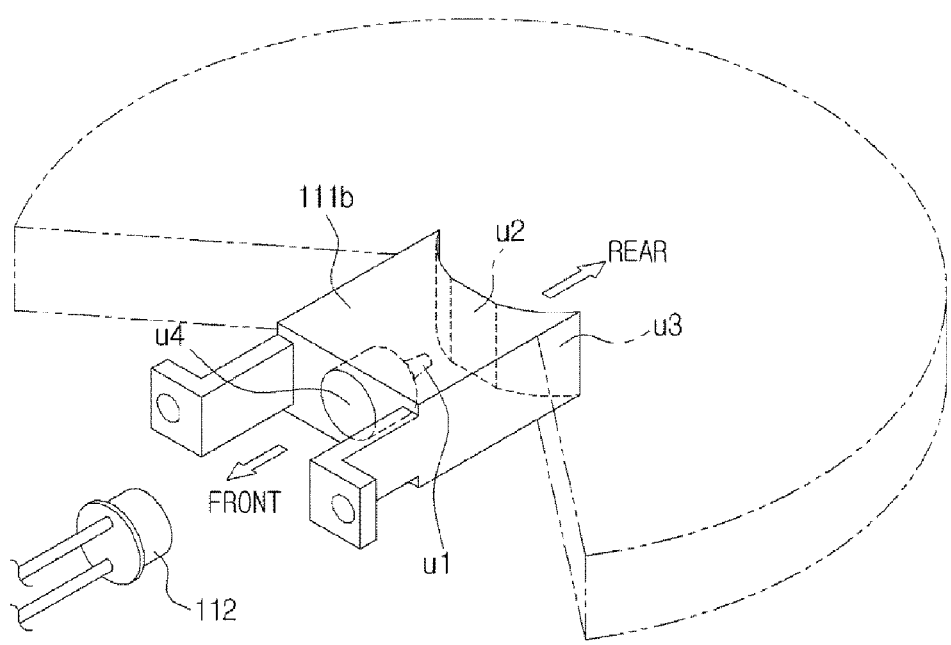
FIG. 7D is a view illustrating a second wide-angle lens included in the obstacle sensing module in accordance with an exemplary embodiment.
Figure 7E:
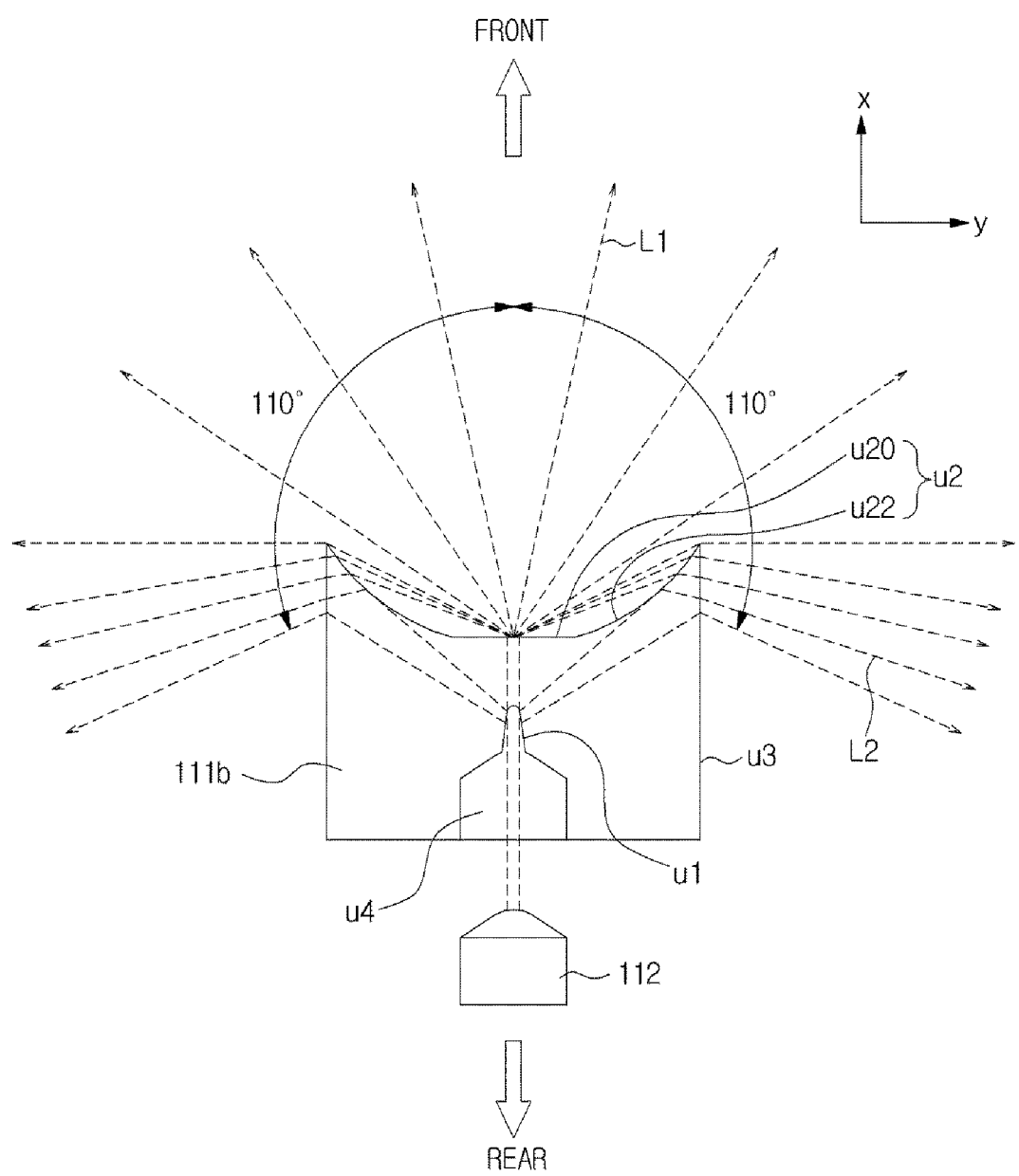
FIG. 7E is a view illustrating diffusion of planar light emerging from the second wide-angle lens included in the obstacle sensing module in accordance with an exemplary embodiment.

FIG. 7D is a view illustrating a second wide-angle lens included in the obstacle sensing module in accordance with an exemplary embodiment. FIG. 7E is a view illustrating diffusion of planar light emerging from the second wide-angle lens included in the obstacle sensing module in accordance with an exemplary embodiment.

Referring to FIGS. 7D and 7E, the second wide-angle lens which is designated by reference numeral "111b" may include a transparent member allowing light incident from a light source thereupon to pass therethrough. The light source is designated by reference numeral "112". The second wide-angle lens 111b reflects or refracts light incident from the light source 112, thereby generating planar light L1 and planar light L2.

The second wide-angle lens 111b may include a first diffusion surface u1 to refract light incident from the light source 112 so as to diffuse the incident light within the second wide-angle lens 111b, a second diffusion surface u2 to refract the light refracted by the first diffusion surface u1 outwardly of the second wide-angle lens 111b or to reflect the light refracted by the first diffusion surface u1 toward the interior of the second wide-angle lens 111b, third diffusion surfaces u3 to refract the light refracted by the first diffusion surface u1 or the light reflected by the second diffusion surface u2 so as to generate planar light, and a holding recess u4 formed at a surface opposite to the second diffusion surface u2, to hold the light source 112 received therein.

For example, the planar light may include first planar light L1 and second planar light L2. The first planar light L1 is generated as light refracted by the first diffusion surface u1 is again refracted by the second diffusion surface u2. On the other hand, the second planar light L2 is generated as the light refracted by the first diffusion surface u1 is reflected by the second diffusion surface u2.

The second diffusion surface u2 may generate the first planar light L1 and the second planar light L2 by refracting or reflecting light.

The second diffusion surface u2 may include a U or V-shaped concave structure formed at one surface of the second wide-angle lens 111b.

The second diffusion surface u2 may include a first surface u20 formed at a central portion of the second diffusion surface u2, to extend perpendicularly to a forward direction in the form of a flat surface, and second surfaces u22 having a curved shape while forming a predetermined angle with regard to the first surface u20.

The first surface u20 may generate planar light by refracting light reflected by the first diffusion surface u1, whereas the second surfaces u22 may reflect, toward the third diffusion surfaces u3, the light reflected by the first diffusion surface u2.

The diffusion range of planar light may be adjusted in accordance with the predetermined angle or curvature of the second surfaces u22.

Alternatively, the second diffusion surface u2 or third diffusion surfaces u3 may have a convex shape to reduce the thickness of planar light, namely, to thin planar light.

The holding recess u4 may be centrally formed at the surface opposite to the second diffusion surface u2. In this case, the first diffusion surface u1 may be additionally formed at an inner surface of the holding recess u4, in the form of a concave structure.

Hereinafter, the path of light in the second wide-angle lens 111b will be described. First, light emitted from the light source 112 is refracted by the first diffusion surface u1 of the second wide-angle lens 111b while passing through the first diffusion surface u1. The refracted light is then diffused within the second wide-angle lens 111b.

A part of the light diffused within the second wide-angle lens 111b is refracted while passing through the second diffusion surface u2 and, as such, may be emitted outwardly of the second wide-angle lens 111b. This light is referred to as the first planar light L1.

When light passes through the second diffusion surface u2, it is refracted at a refraction angle greater than an incidence angle thereof because this case corresponds to the case in which light is incident from a high-density medium upon a low-density medium. In accordance with such refraction, the refracted light is diffused in various directions.

A part of the first planar light L1 is refracted two times in that it is incident upon the second wide-angle lens 111b while passing through the second diffusion surface u2 of the second wide-angle lens 111b, and is then emitted outwardly of the second wide-angle lens 111b in the form of first planar light L1. In accordance with generation of such first planar light L1, the planar light emission zone of the light emitter 110 is widened.

The remaining part of the light diffused into the interior of the second wide-angle lens 111b may be reflected by the second diffusion surface u2 toward the interior of the second wide-angle lens 111b.

That is, when light incident upon the second wide-angle lens 111b reaches a boundary surface of a material exhibiting a lower index of refraction than the second wide-angle lens 111b, namely, the second diffusion surface u2, the light may be totally reflected because a total reflection phenomenon occurs at such a surface.

For occurrence of such a total reflection phenomenon, it may be necessary for the incidence angle of light to be equal to or greater than a critical angle. For the incidence angle of light equal to or greater than the critical angle, it may be necessary to adjust the index of refraction of the material and the shape of the second wide-angle lens 111b.

Light reflected toward the interior of the second wide-angle lens 111b by the second diffusion surface u2 is refracted while passing through the third diffusion surface u3 and, as such, may be emitted outwardly of the second wide-angle lens 111b. This light is referred to as the second planar light L2.

For example, planar light may be diffused in parallel to the floor over a predetermined angle with regard to a forward direction (an x-axis direction) of the second wide-angle lens 111b.

The predetermined angle may be 110° with regard to the forward direction (x-axis direction) of the second wide-angle lens 111b in a left or right direction and, as such, planar light may be emitted in a state of being totally diffused over an angle of 220°. Of course, the predetermined angle is not limited to the illustrated angle.

Hereinafter, the following description will be given in conjunction with the case in which the sum of angles extending in left and right directions with regard to the forward direction (x-axis direction) of the second wide-angle lens 111b is 220°.

Figure 7F:
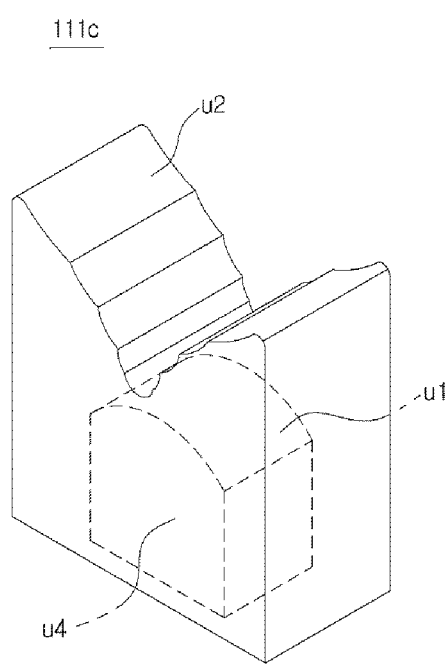
FIG. 7F is a view illustrating a third wide-angle lens included in the obstacle sensing module in accordance with an exemplary embodiment.
Figure 7G:
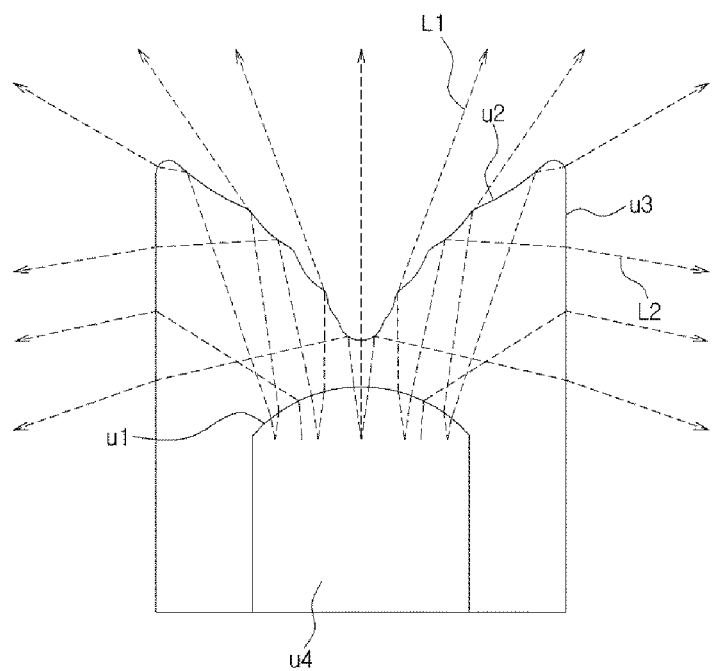
FIG. 7G is a view illustrating diffusion of planar light emerging from the third wide-angle lens included in the obstacle sensing module in accordance with an exemplary embodiment.

FIG. 7F is a view illustrating a third wide-angle lens included in the obstacle sensing module in accordance with an exemplary embodiment. FIG. 7G is a view illustrating diffusion of planar light emerging from the third wide-angle lens included in the obstacle sensing module in accordance with an exemplary embodiment.

Referring to FIGS. 7F and 7G, the third wide-angle lens which is designated by reference numeral "111c" may include a transparent member allowing light incident from a light source (not shown) thereupon to pass therethrough. The third wide-angle lens 111c reflects or refracts light incident from the light source, thereby generating planar light L1 and planar light L2.

The third wide-angle lens 111c may include a first diffusion surface u1 to refract light incident from the light source so as to diffuse the incident light within the third wide-angle lens 111c, a second diffusion surface u2 to refract the light refracted by the first diffusion surface u1 outwardly of the third wide-angle lens 111c or to reflect the light refracted by the first diffusion surface u1 toward the interior of the third wide-angle lens 111c, third diffusion surfaces u3 to refract the light refracted by the first diffusion surface u1 or the light reflected by the second diffusion surface u2, to generate planar light, and a holding recess u4 formed at a surface opposite to the second diffusion surface u2, to hold the light source received therein.

The third wide-angle lens 111c is similar to the second wide-angle lens 111b, except that the second diffusion surface u2 of the third wide-angle lens 111c is formed with wave patterns each having a tapered ridge. By virtue of such wave patterns, the third wide-angle lens 111c may achieve a widened diffusion range of planar light.

Figure 8A:
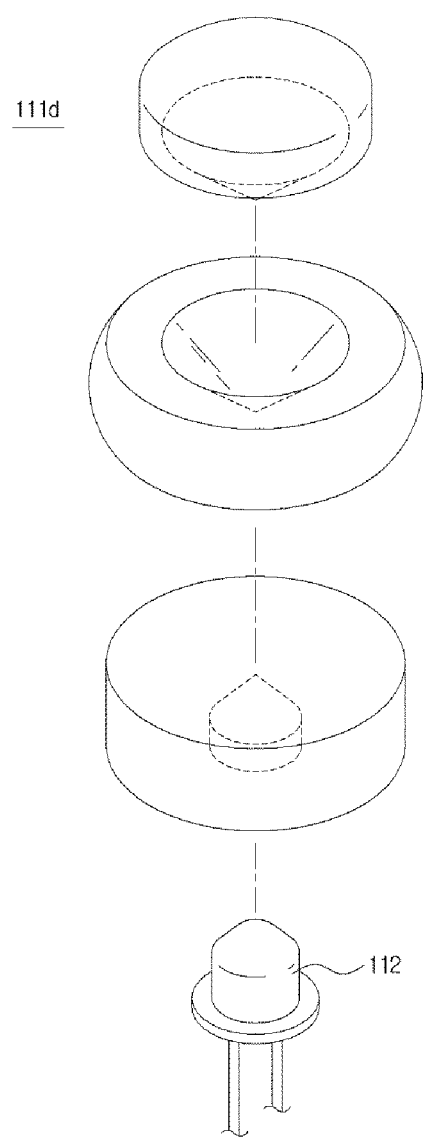
FIG. 8A is an exploded perspective view illustrating a fourth wide-angle lens included in the obstacle sensing module in accordance with an exemplary embodiment.
Figure 8B:
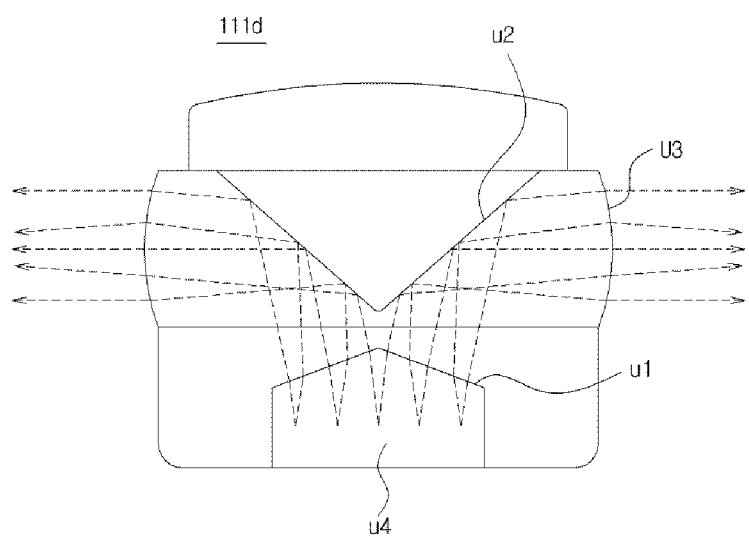
FIG. 8B is a perspective view illustrating the fourth wide-angle lens included in the obstacle sensing module in accordance with an exemplary embodiment.
Figure 8C:
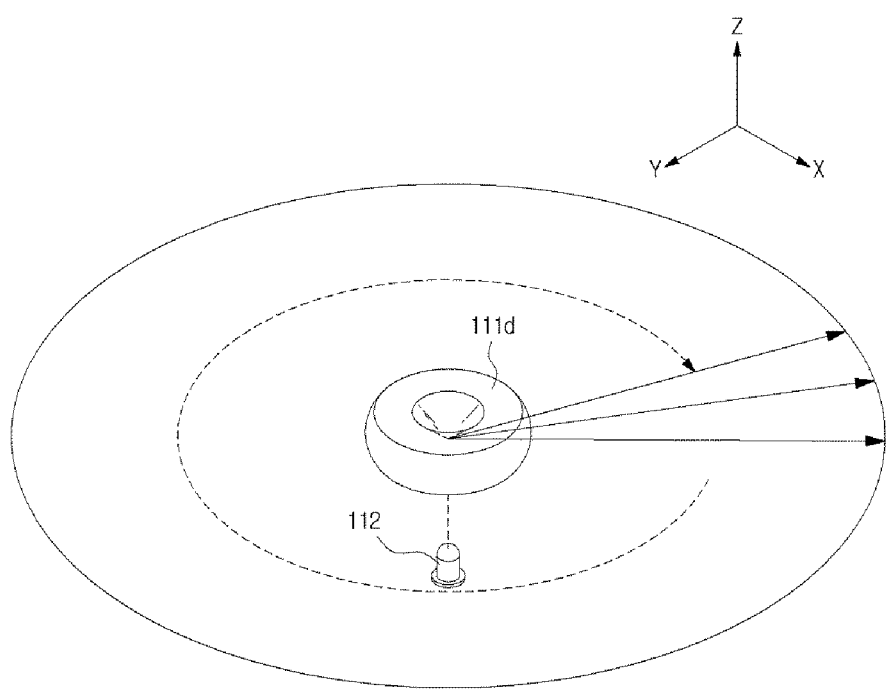
FIG. 8C is a view illustrating diffusion of planar light emerging from the fourth wide-angle lens included in the obstacle sensing module in accordance with an exemplary embodiment.
Figure 8D:
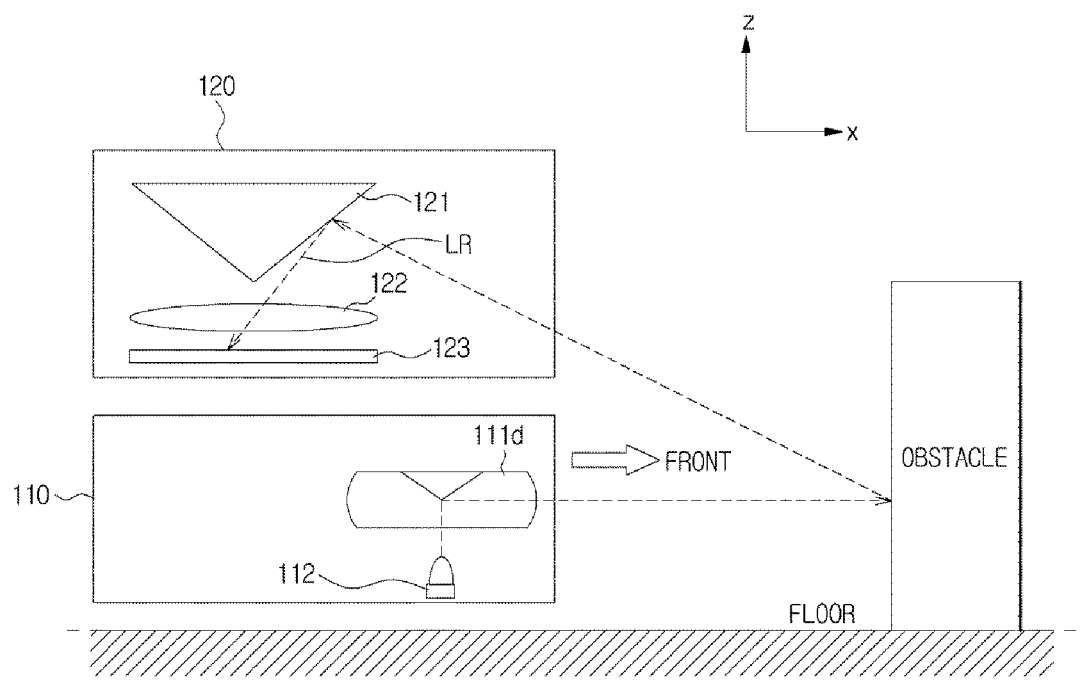
FIG. 8D is a view illustrating a state in which the fourth wide-angle lens according to an exemplary embodiment is installed at the obstacle sensing module.

FIG. 8A is an exploded perspective view illustrating a fourth wide-angle lens included in the obstacle sensing module in accordance with an exemplary embodiment. FIG. 8B is a perspective view illustrating the fourth wide-angle lens included in the obstacle sensing module in accordance with an exemplary embodiment. FIG. 8C is a view illustrating diffusion of planar light emerging from the fourth wide-angle lens included in the obstacle sensing module in accordance with an exemplary embodiment. FIG. 8D is a view illustrating a state in which the fourth wide-angle lens according to an exemplary embodiment is installed at the obstacle sensing module.

Referring to FIGS. 8A to 8D, the fourth wide-angle lens which is designated by reference numeral "111d" may generate planar light by reflecting light emitted from a light source. The light source is designated by reference numeral "112".

The fourth wide-angle lens 111d may include a transparent member allowing light incident from the light source 112 thereupon to pass therethrough. The fourth wide-angle lens 111d reflects or refracts light incident from the light source 112, thereby generating planar light.

The fourth wide-angle lens 111d may include a first diffusion surface u1 to refract light incident from the light source 112 so as to diffuse the incident light within the fourth wide-angle lens 111d, a second diffusion surface u2 to reflect the light refracted by the first diffusion surface u1 toward the interior of the fourth wide-angle lens 111d, a third diffusion surface u3 to refract the light reflected by the second diffusion surface u2 so as to generate planar light, and a holding recess u4 formed at a surface opposite to the second diffusion surface u2, to hold the light source received therein.

The second diffusion surface u2 may be formed at one surface of the fourth wide-angle lens 111d while having a concave conical shape.

The second diffusion surface u2 of the fourth wide-angle lens 111d may be a surface of the fourth wide-angle lens 111d forming a boundary to a medium having an index of refraction different from that of the fourth wide-angle lens 111d.

For example, the medium may be air having an index of refraction corresponding to "1" or may be a material having a lower index of refraction than that of the fourth wide-angle lens 111d.

The material may be formed to be coupled with the fourth-wide angle lens 111d.

The third diffusion surface u3 may be a side surface of the fourth wide-angle lens 111d, and may have a convex shape to reflect light reflected by the second diffusion surface u2 so as to further thin planar light.

The holding recess u4 may have a central axis aligned with the central axis of the second diffusion surface u2. The holding recess u4 may be centrally formed at a surface opposite to the second diffusion surface u2 in the form of a concave structure. Although the holding recess u4 is illustrated as being formed at the fourth wide-angle lens 111d, it may be formed to be separate from the fourth wide-angle lens 111d so as to be coupled to the fourth wide-angle lens 111d.

Hereinafter, the path of light in the fourth wide-angle lens 111d will be described. First, light emitted from the light source 112 is refracted by the first diffusion surface u1 of the fourth wide-angle lens 111d while passing through the first diffusion surface u1. The light emerging from the first diffusion surface u1 is then reflected by the second diffusion surface u2, and is then refracted while passing through the third diffusion surface u3 formed at the side surface of the fourth wide-angle lens 111d. At this time, the light is converted into planar light while passing through the third diffusion surface u3 and, as such, may be irradiated in omni-directions of 360°.

Meanwhile, the principle of reflection of light from the second diffusion surface u2 of the fourth wide-angle lens 111d is on the basis of the principle of total reflection.

That is, when light incident upon the fourth wide-angle lens 111d reaches a boundary surface of a material exhibiting a lower index of refraction than the fourth wide-angle lens 111d, namely, the second diffusion surface u2, the light may be totally reflected because a total reflection phenomenon occurs at the surface.

For occurrence of such a total reflection phenomenon, it may be necessary for the incidence angle of light to be equal to or greater than a critical angle. For the incidence angle of light equal to or greater than the critical angle, it may be necessary to adjust the index of refraction of the material and the height and radius of the second diffusion surface u2 which has a conical shape.

Snell's law is applied to the principle of reflection of light at the side surface of the fourth wide-angle lens 111d.

Referring to FIG. 6D, the light source 112 of the light emitter 110 emits light in a direction perpendicular to the floor.

The fourth wide-angle lens 111d may diffuse, in omni-directions, planar light generated in accordance with reflection of light emitted from the light source 112. Such planar light may be irradiated in a direction parallel to the floor or in a direction inclined from the floor.

As a result, the obstacle sensing module may sense an obstacle disposed at a higher or lower level than that of an obstacle disposed on the floor.

The planar light may be reflected by an obstacle, and the reflected light may be again reflected after being transmitted to the reflection mirror 121.

When reflection light LR again reflected by the reflection mirror 121 is incident upon the optical lens 122, it is refracted by the optical lens 122 while passing through the optical lens 122. The light emerging from the optical lens 122 may be transmitted to the optical sensor 123.

Figure 9A:
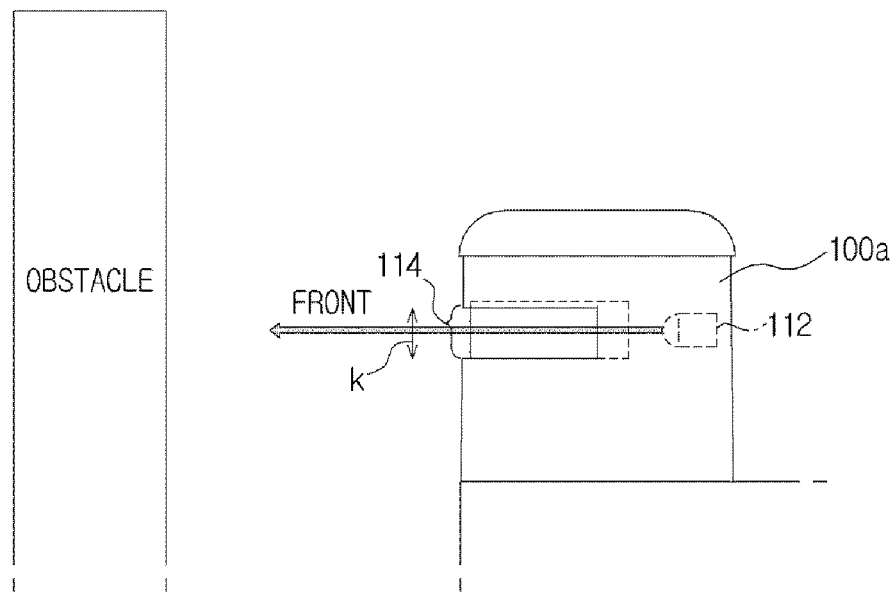
FIG. 9A is a view illustrating a slit capable of adjusting the thickness of planar light when one of the first to third wide-angle lenses is employed, in accordance with an exemplary embodiment.
Figure 9B:
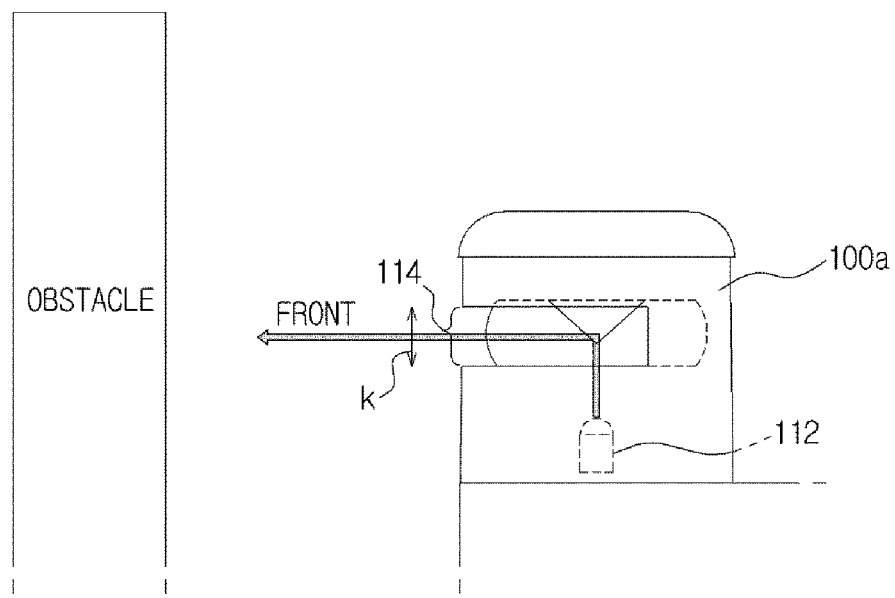
FIG. 9B is a view illustrating a slit capable of adjusting the thickness of planar light when the fourth wide-angle lens is employed, in accordance with an exemplary embodiment.

FIG. 9A is a view illustrating a slit capable of adjusting the thickness of planar light when one of the first to third wide-angle lenses is employed, in accordance with an exemplary embodiment. FIG. 9B is a view illustrating a slit capable of adjusting the thickness of planar light when the fourth wide-angle lens is employed, in accordance with an exemplary embodiment.

Referring to FIG. 9A, at least one slit 114 having a narrow vertical gap may be arranged in front of the first, second, or third wide-angle lens 111a, 111b, or 111c. As planar light irradiated from the first, second, or third wide-angle lens 111a, 111b, or 111c passes through the slit 114, thinner planar light parallel to the floor may be formed. It may be possible to generate planar light having a desired thickness by adjusting the size of the gap formed at the slit 114, namely, "k".

Referring to FIG. 9B, at least one slit 114 having a narrow vertical gap may be arranged in front of the fourth wide-angle lens 111d. As planar light irradiated from the fourth wide-angle lens 111d passes through the slit 114, thinner planar light parallel to the floor may be formed. It may be possible to generate planar light having a desired thickness by adjusting the size k of the gap formed at the slit 114.

Figure 10A:
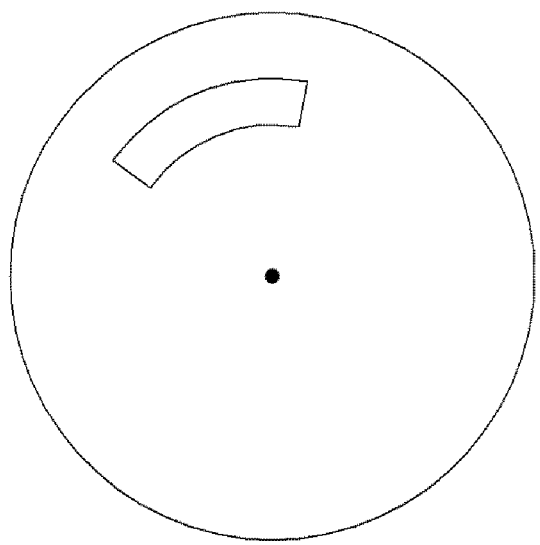
FIG. 10A is a view illustrating obstacle sensing results obtained when the size of the slit in the obstacle sensing module is large in accordance with an embodiment.
Figure 10B:
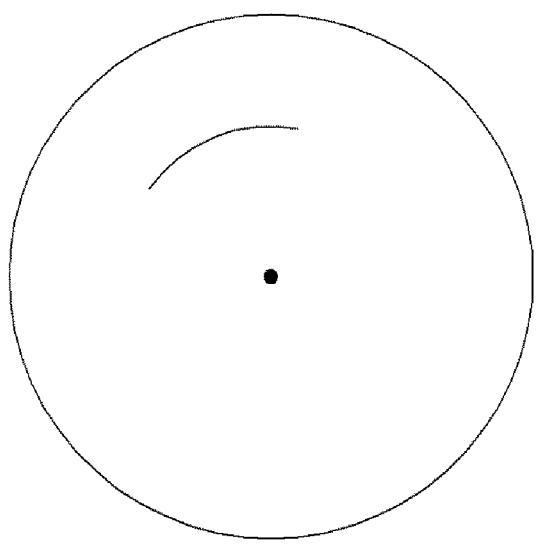
FIG. 10B is a view illustrating obstacle sensing results obtained when the size of the slit in the obstacle sensing module is small in accordance with an exemplary embodiment.

FIG. 10A is a view illustrating obstacle sensing results obtained when the size of the slit in the obstacle sensing module is large in accordance with an exemplary embodiment. FIG. 10B is a view illustrating obstacle sensing results obtained when the size of the slit in the obstacle sensing module is small in accordance with an exemplary embodiment.

Referring to FIG. 10A, obstacle sensing results of the obstacle sensing module 100 when the size k of the gap of the slit 114 is large. In this case, it may be seen that light emitted from the light emitter 110 is thick. On the other hand, Referring to FIG. 10B, obstacle sensing results of the obstacle sensing module 100 when the size k of the gap of the slit 114 is small. In this case, it may be seen that light emitted from the light emitter 110 is thin.

Figure 11:
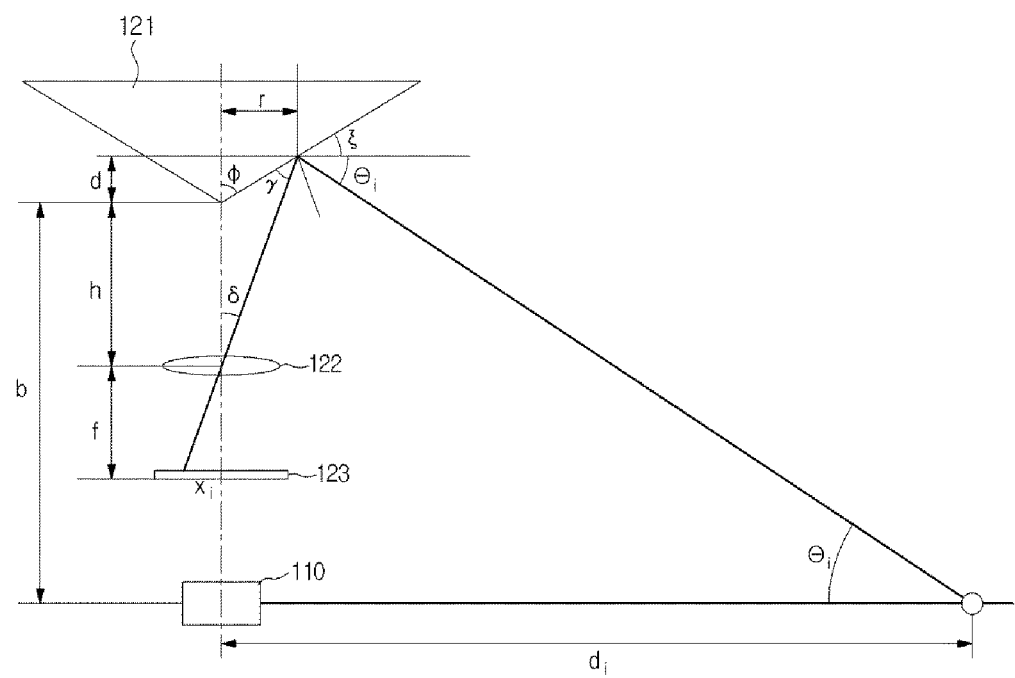
FIG. 11 is a schematic view illustrating a relation between each constituent element of the obstacle sensing module and an obstacle for obstacle distance calculation according to an exemplary embodiment.

FIG. 11 is a schematic view illustrating a relation between each constituent element of the obstacle sensing module and an obstacle for obstacle distance calculation according to an exemplary embodiment.

The angle formed between incident light and reflection light in the case in which planar light irradiated from the light emitter 110 is reflected from an obstacle, namely, an angle $\theta_i$, may be expressed by the following Expression 1:

$$\theta_i = \gamma - \xi \qquad \text{[Expression 1]}$$
$$\xi = \frac{\pi}{2} - \phi$$
$$\gamma = \phi - \delta$$
$$\delta = \tan^{-1}\left(\frac{x_i}{f}\right)$$
$$\therefore \theta_i = 2\phi - \frac{\pi}{2} - \tan^{-1}\left(\frac{x_i}{f}\right)$$

The distance between the obstacle sensing module 100 and an obstacle, namely, a distance $d_i$, may be derived, using "$\theta_i$," and the following Expression 2:

$$d_i = \gamma + \frac{(b+d)}{\tan\theta_i} \qquad \text{[Expression 2]}$$
$$\text{if } r, d \ll b,$$
$$d_i \cong \frac{b}{\tan\theta_i}$$
$$\text{Let } \psi = 2\phi - \frac{\pi}{2},$$
$$\theta_i = \psi - \delta,$$
$$\tan\theta_i = \frac{\tan\psi - \tan\delta}{1 + \tan\psi \tan\delta}$$
$$= \frac{\tan\psi - \frac{x_i}{f}}{1 + \tan\psi \frac{x_i}{f}}$$
$$\therefore d_i = b\frac{f + kx_i}{fk - x_i}, \; k = \tan\left(2\phi - \frac{\pi}{2}\right)$$

Figure 12A:
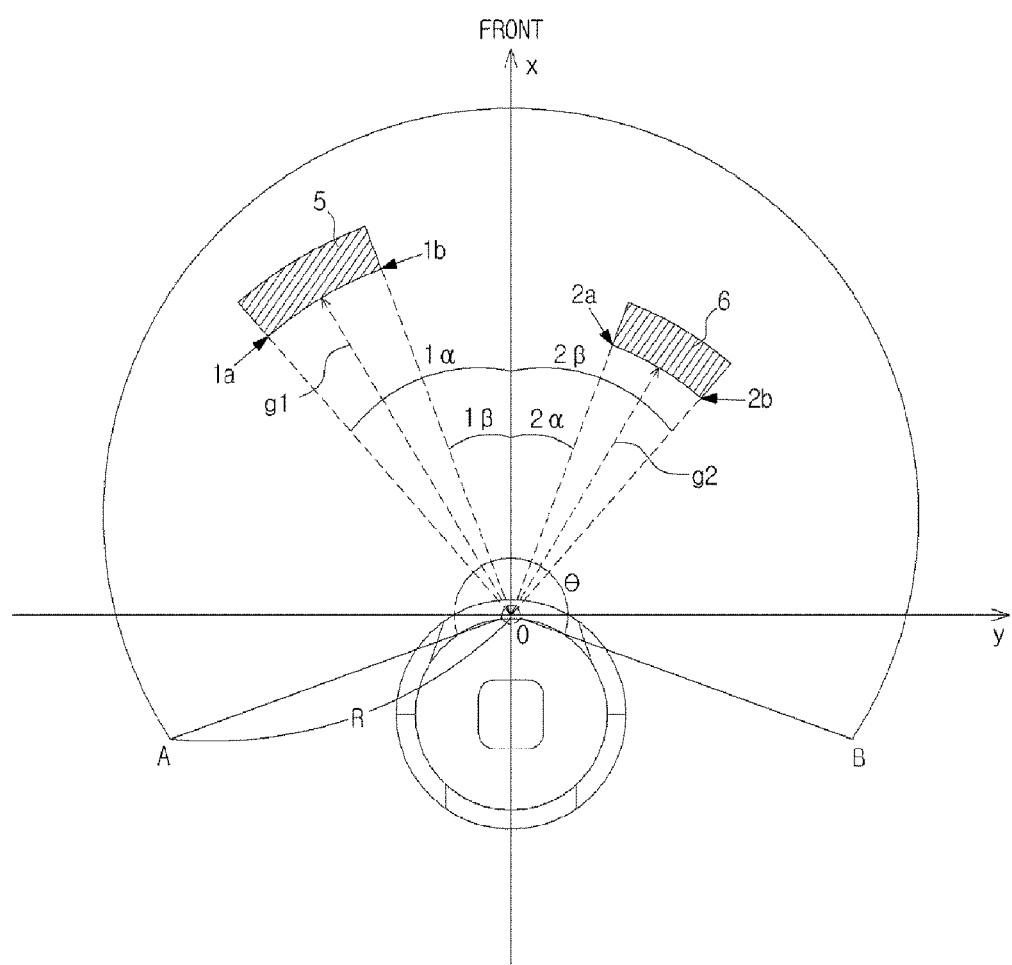
FIG. 12A is a plan view of the obstacle sensing module according to an exemplary embodiment and obstacles.
Figure 12B:
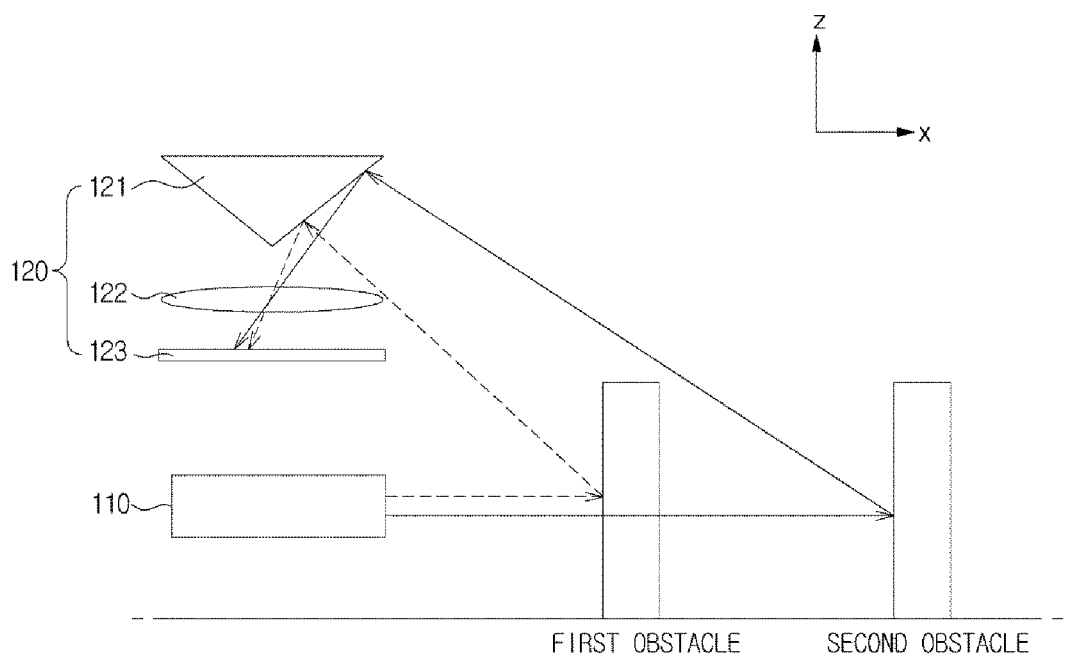
FIG. 12B is an elevation view of the obstacle sensing module according to an exemplary embodiment and the obstacles.
Figure 12C:
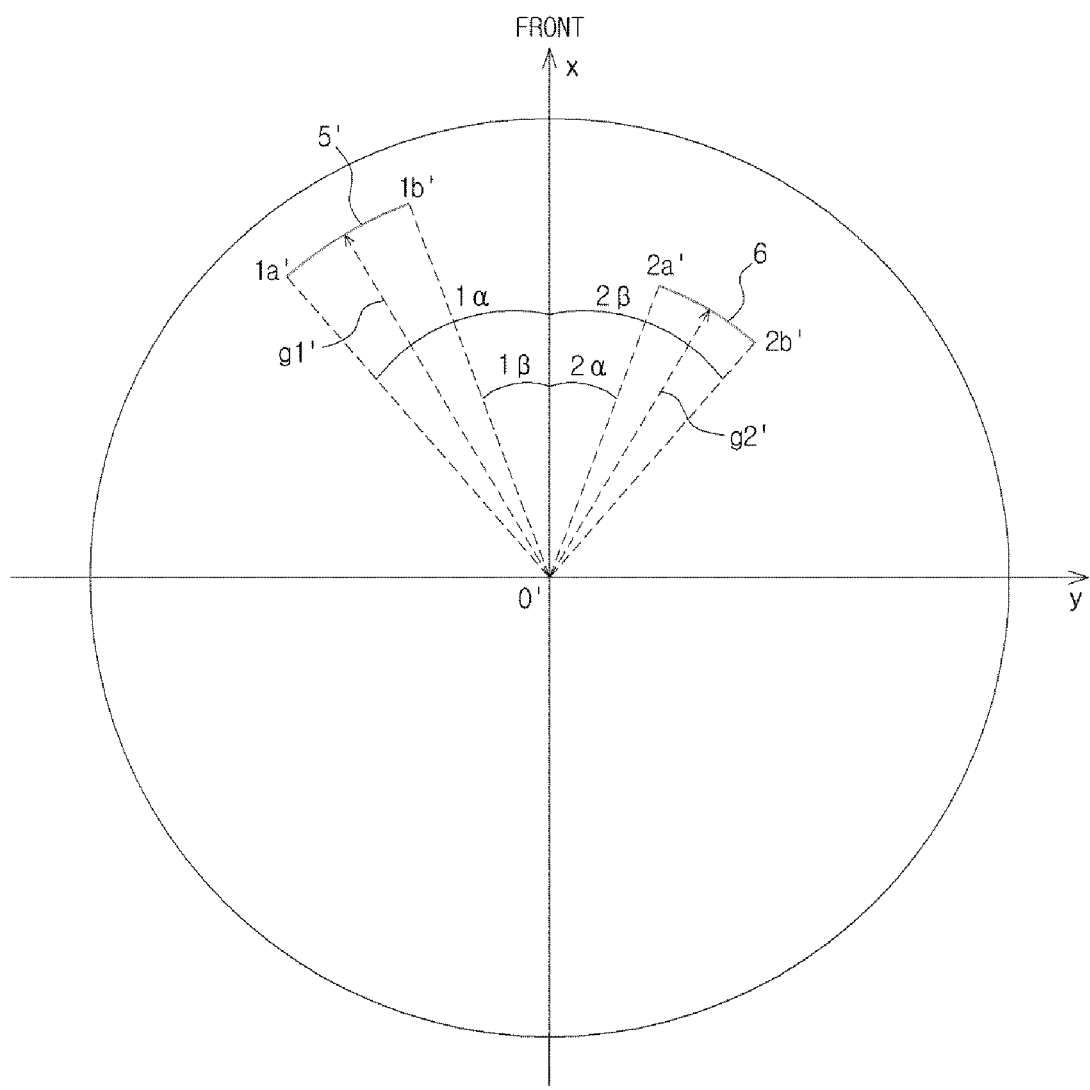
FIG. 12C is a view of images received by the image sensor of the obstacle sensing module according to an exemplary embodiment.

FIG. 12A is a plan view of the obstacle sensing module according to an exemplary embodiment and obstacles. FIG. 12B is an elevation view of the obstacle sensing module according to an exemplary embodiment and the obstacles. FIG. 12C is a view of images received by the image sensor of the obstacle sensing module according to an exemplary embodiment.

The following description is applied to each of the cases in which the first to fourth wide-angle lenses 111a to 111d are employed, respectively.

Referring to FIG. 12A, there are an x-axis extending in a forward direction of the obstacle sensing module 100 while being parallel to the floor, and a y-axis perpendicular to the x-axis. A first zone, which may be sensed by the obstacle sensing module, is present on a plane established by the x-axis and y-axis.

The first zone may be similar to a zone defined by an arc AB defined in a circle having a radius R by two radial lines OA and OB respectively extending from a center O of the circle to two points A and B on the circle while having a central angle AOB of θ. In this case, the radius R may be a far distance.

When the second wide-angle lens 111b is employed, "θ" may be 220°. When the fourth wide-angle lens 111d is employed, "θ" may have an increased value. The angle θ is not limited to the above-described value, and may have other values.

In the first zone, there are a first obstacle 5 and a second obstacle 6 disposed at positions spaced by different distances and different angles from the origin O, respectively. Obstacles present in the first zone are not limited to the first obstacle 5 and second obstacle 5. One or more obstacles may be present in the first zone. The following description will be given in conjunction with the case in which there are two obstacles, namely, the first and second obstacles 5 and 6, in the first zone.

The first obstacle 5 is disposed within an angular range extending in a counter-clockwise direction with respect to the x-axis between an angle 1β and an angle 1α while being spaced from the origin O by a distance g1. The second obstacle 6 is disposed within an angular range extending in a clockwise direction with respect to the x-axis between an angle 2α and an angle 2β while being spaced from the origin O by a distance g2.

Here, "1α" is an angle between the x-axis and an end point 1a of the first obstacle 5 spaced from the x-axis by a maximum distance, whereas "1β" is an angle between the x-axis and an end point 1b of the first obstacle 5 spaced from the x-axis by a minimum distance.

"2α" is an angle between the x-axis and an end point 2a of the second obstacle 5 spaced from the x-axis by a minimum distance, whereas "2β" is an angle between the x-axis and an end point 2b of the second obstacle 5 spaced from the x-axis by a maximum distance.

Referring to FIG. 12B, it may be seen that planar light irradiated from the light emitter 110 travels in the forward direction of the light emitter 110, and is then transmitted to the light receiver 120 after being reflected by obstacles spaced from the obstacle sensing module 100 by different distances.

The following description will be given in conjunction with the case in which the reflection mirror 121 is a conical mirror.

When an obstacle is nearer to the obstacle sensing module 100, reflection light reflected from the obstacle reaches a point nearer to the apex of the reflection mirror 121. When reflection light reflected from the obstacle reaches a point nearer to the apex of the reflection mirror 121, reflection light emerging from the optical lens 122 is written in the optical sensor 123 at a location nearer to the center of the optical sensor 123.

That is, when the obstacle is nearer to the obstacle sensing module 100, reflection light is written in the optical sensor 123 at a location nearer to the center of the optical sensor 123.

Referring to FIG. 12C, images of the first and second obstacles 5 and 6 written on the optical sensor 123 may be seen. Reflection light reflected from each obstacle after being irradiated from the light emitter 110 is written in the optical sensor 123 in the form of an image after being reflected by the reflection mirror 121 and passing through the optical lens 122.

The first obstacle 5 is written within a angular range extending in a left direction with respect to an x-axis between an angle 1β and an angle 1α while being spaced from an origin O' by a distance g1'. That is, the first obstacle 5 is written in the optical sensor 123 in the form of a figure similar to an arc 5' defined in a circle having a radius g1' by two radial lines O'1a' and O'1b' respectively extending from a center O' of the circle to two points 1a' and 1b' on the circle.

The second obstacle 6 is written within a angular range extending in a right direction with respect to the x-axis between an angle 2α and an angle 2β while being spaced from the origin O' by a distance g2'. That is, the second obstacle 6 is written in the optical sensor 123 in the form of a figure similar to an arc 6' defined in a circle having a radius g2' by two radial lines O'2a' and O'2b' respectively extending from the center O' of the circle to two points 2a' and 2b' on the circle.

Electrical image signals converted by the optical sensor 123 are converted into digital image signals by the image processing circuit 124. The digital image signals are transmitted to the obstacle sensing controller (not shown) or control unit (not shown).

The obstacle sensing controller or control unit analyzes images, based on the digital image signals, into which the images have been converted, to determine distances from the obstacle sensing module 100 to respective obstacles 5 and 6, and positions of the obstacles 5 and 6.

Figure 13A:
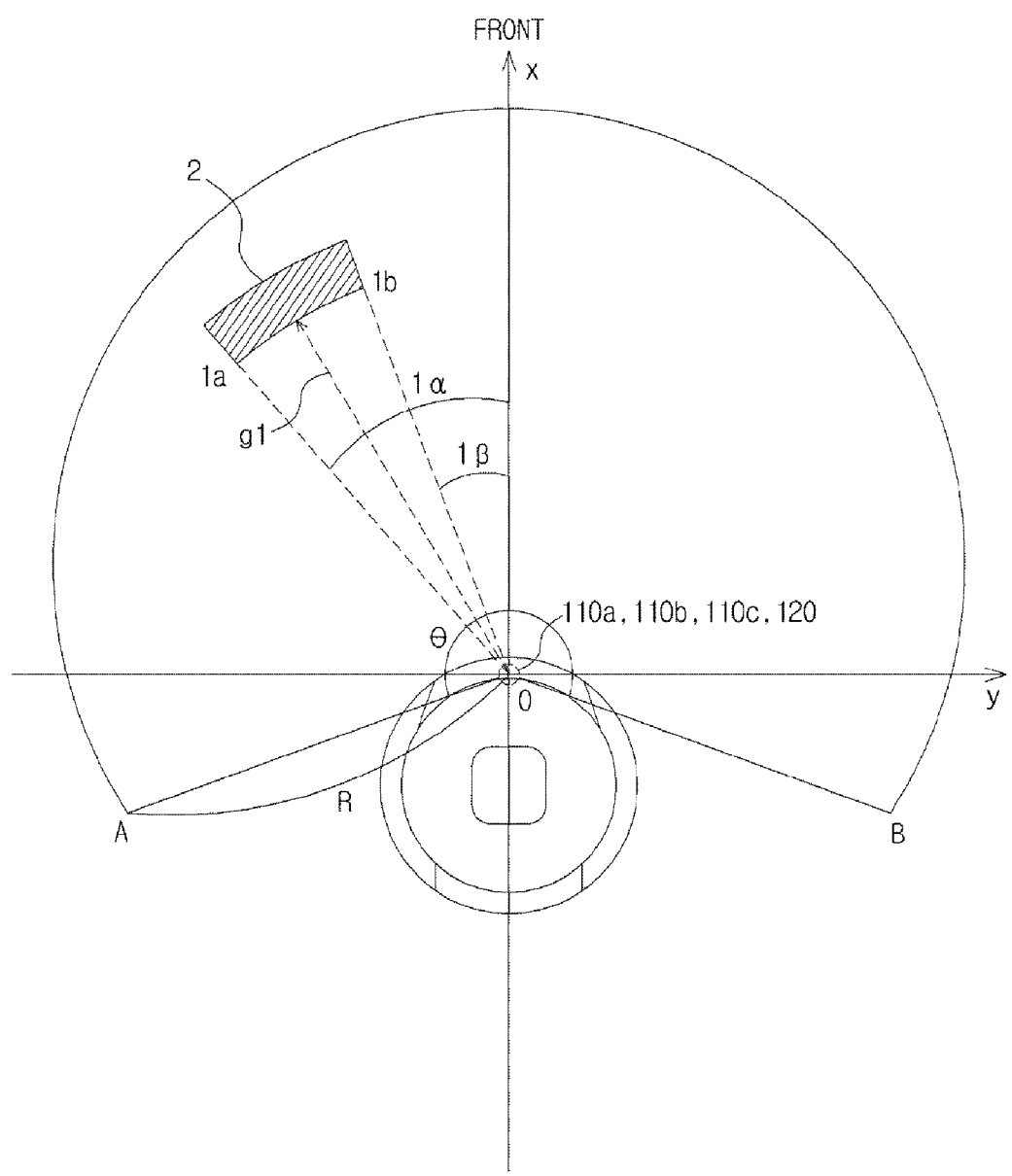
FIG. 13A is a plan view of a plurality of light emitters which are included in the obstacle sensing module while being installed at positions having different levels in accordance with an exemplary embodiment, and an obstacle.
Figure 13B:
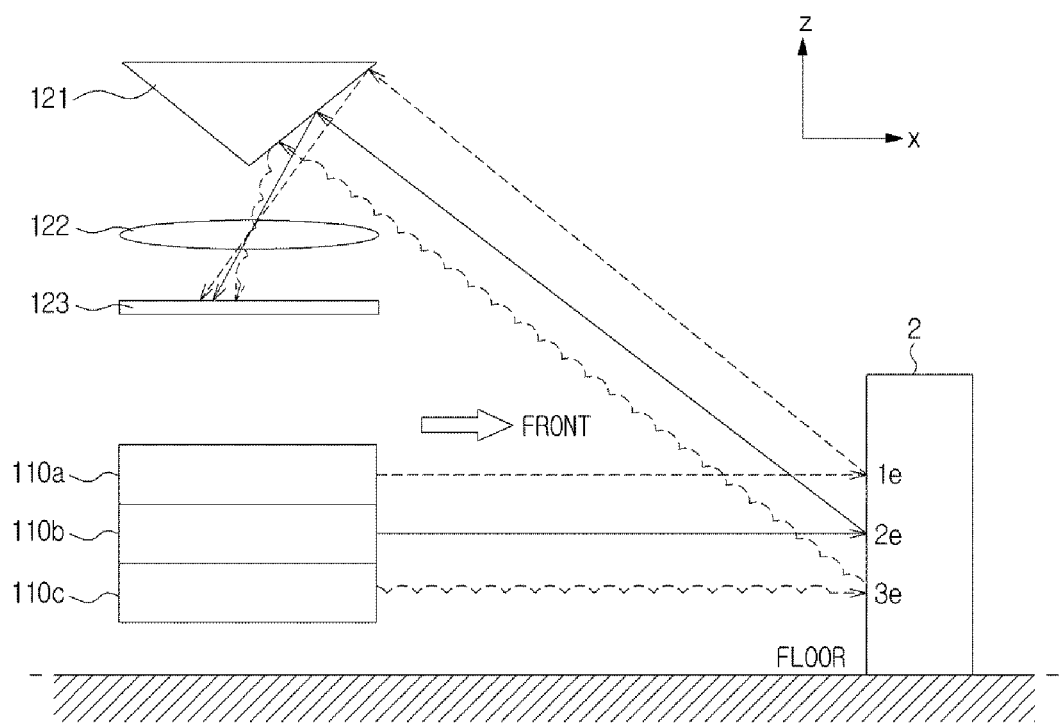
FIG. 13B is an elevation view of the light emitters which are included in the obstacle sensing module while being installed at positions having different levels in accordance with an exemplary embodiment, and the obstacle.
Figure 13C:
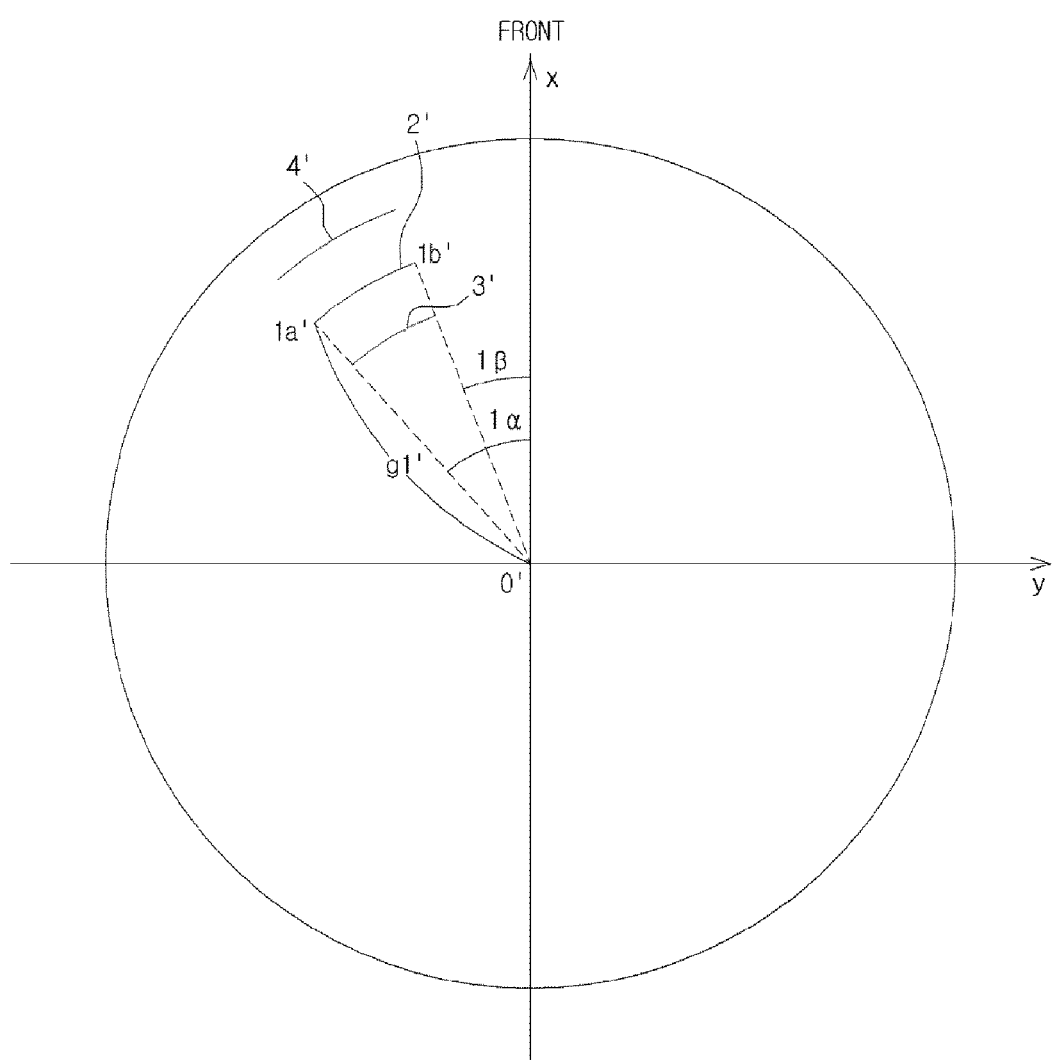
FIG. 13C is a view of planar light received by the image sensor in the form of an image after being irradiated from each of the plural light emitters included in the obstacle sensing module while being installed at different levels and reflected by the obstacle in accordance with an exemplary embodiment.

FIG. 13A is a plan view of a plurality of light emitters which are included in the obstacle sensing module while being installed at positions having different levels in accordance with an exemplary embodiment, and an obstacle. FIG. 13B is an elevation view of the light emitters which are included in the obstacle sensing module while being installed at positions having different levels in accordance with an exemplary embodiment, and the obstacle. FIG. 13C is a view of planar light received by the image sensor in the form of an image after being irradiated from each of the plural light emitters included in the obstacle sensing module while being installed at different levels and reflected by the obstacle in accordance with an exemplary embodiment.

The following description is applied to each of the cases in which the first to fourth wide-angle lenses 111a to 111d are employed, respectively.

Referring to FIG. 13A, there is a first zone as described with reference to FIG. 10A. An obstacle 2 is present in the first zone. One or more obstacles may be present in the first zone. The following description will be given in conjunction with the case in which there is one obstacle in the first zone.

The obstacle sensing module (not shown) includes three light emitters 110a, 110b, and 110c, and one light receiver 120. The three light emitters 110a, 110b, and 110c irradiate planar light at different levels from the floor, respectively. Planar light irradiated from each of the three light emitters 110a, 110b, and 110c may rectilinearly travel in parallel to the floor or may rectilinearly travel while being inclined from the floor. The three light emitters 110a, 110b, and 110c may be disposed at the same position on the cleaning robot 1, or may be disposed at different positions on the cleaning robot 1, respectively.

For example, the light emitters 110a, 110b, and 110c illustrated in FIG. 13A are disposed at the same position on the cleaning robot 1, and irradiate planar light at different levels from the floor, respectively.

Of course, the number of light emitters 110 is not limited to the above-described number. The number of light emitters 110 may be one or more. In addition, there is no limitation on the positions of the plural light emitters 110a, 110b, and 110c on the cleaning robot 1.

The light receiver 120 may receive reflection light beams respectively reflected from the obstacle 2 after being irradiated from the plural light emitters 110a, 110b, and 110c in a simultaneous manner or in a sequential manner.

Referring to FIG. 13B, it may be seen that planar light irradiated from each of the three light emitters 110a, 110b, and 110c travels rectilinearly in a forward direction of the corresponding 110a, 110b, or 110c, and is then transmitted to the light receiver 120 after being reflected by the obstacle 2.

The following description will be given in conjunction with the case in which the reflection mirror 121 is a conical mirror.

When the level, at which planar light is reflected from the obstacle 2, is nearer to the floor, the reflection light reflected from the obstacle 2 reaches a point nearer to the apex of the reflection mirror 121. When reflection light reflected from the obstacle 1 reaches a point nearer to the apex of the reflection mirror 121, reflection light emerging from the optical lens 122 is written in the optical sensor 123 at a location nearer to the center of the optical sensor 123. That is, when the level, at which planar light is reflected from an obstacle, is nearer to the floor, reflection light is written in the optical sensor 123 at a location nearer to the center of the optical sensor 123.

Referring to FIG. 13C, images of the obstacle 2 written on the optical sensor 123 may be seen. Reflection light reflected from the obstacle 2 after being irradiated from each of the light emitters 110a, 110b, and 110c is written in the optical sensor 123 in the form of an image after being reflected by the reflection mirror 121 and passing through the optical lens 122.

When there is a plurality of light emitters, for example, the light emitters 110a, 110b, and 110c, one of the light emitters 110a, 110b, and 110c may be set as a reference light emitter. The reference light emitter may set the distance between the obstacle sensing module 100 and the obstacle. The following description will be given in conjunction with the case in which the second light emitter 110b is set as the reference light emitter.

Planar light irradiated from the second light emitter 110b is reflected at a level 2e of the obstacle 2. Based on the planar light irradiated from the second light emitter 110b, the obstacle 2 is written within a angular range extending in a counter-clockwise direction with respect to an x-axis between an angle 1β and an angle 1α while being spaced from an origin O' by a distance g1'. That is, the obstacle 2 is written in the optical sensor 123 in the form of a figure similar to an arc 2' defined in a circle having a radius g1' by two radial lines O'1a' and O'1b' respectively extending from a center O' of the circle to two points 1a' and 1b' on the circle.

Planar light irradiated from the first light emitter 110a is reflected at a level 1e of the obstacle 2. Planar light irradiated from the first light emitter 110a is written in the optical sensor 123 at a location spaced from the center O' by a greater distance than the distance g1' in the form of a figure similar to an arc 4'.

Planar light irradiated from the third light emitter 110c is reflected at a level 3e of the obstacle 2. Planar light irradiated from the third light emitter 110c is written in the optical sensor 123 at a location spaced from the center O' by a smaller distance than the distance g1' in the form of a figure similar to an arc 3'.

Electrical image signals converted by the optical sensor 123 are converted into digital image signals by the image processing circuit 124. The digital image signals are transmitted to the obstacle sensing controller (not shown) or control unit (not shown).

The obstacle sensing controller or control unit analyzes images, based on the digital image signals, into which the images have been converted, to determine the distance between the obstacle sensing module 100 and the obstacle, the position of the obstacle, the height of the obstacle, and the shape of the obstacle.

The obstacle sensing controller or control unit may determine the height of the obstacle 2, based on the three arcs 2', 3', and 4' written in the optical sensor 123, and the levels 1e, 2e, and 3e of the three light emitters 110a, 110b, and 110c installed in the obstacle sensing module 100.

Figure 14:
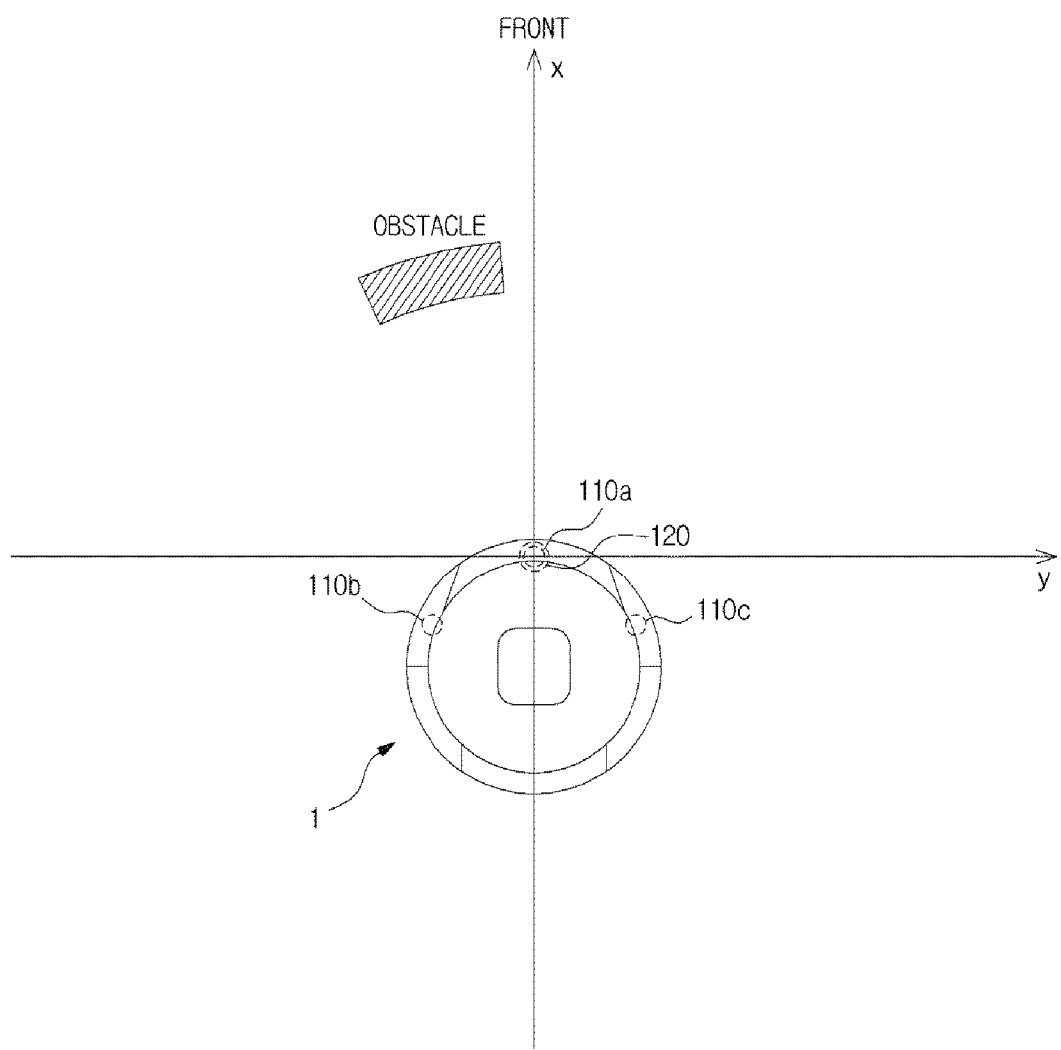
FIG. 14 is a plan view of a plurality of light emitters which are included in the obstacle sensing module while being installed at different positions in accordance with an exemplary embodiment, and an obstacle.

FIG. 14 is a plan view of a plurality of light emitters which are included in the obstacle sensing module while being installed at different positions in accordance with an exemplary embodiment, and an obstacle.

Referring to FIG. 14, a plurality of light emitters, for example, light emitters 110a, 110b, and 110c, may be installed at different positions on the cleaning robot 1.

For example, the second light emitter 110b and the light receiver 120 may be installed at the same position at the front side of the cleaning robot 1. The first light emitter 110a may be installed at a left side of the second light emitter 110b, whereas the third light emitter 110c may be installed at a right side of the second light emitter 110b.

The obstacle sensing controller (not shown) or the control unit (not shown) may determine the distance between the obstacle sensing module (not shown) and the obstacle, the position of the obstacle, the height of the obstacle, and the shape of the obstacle in a similar manner to that of the above-described case in which the plural light emitters 110a, 110b, and 110c, are installed at the same position.

When the plural light emitters 110a, 110b, and 110c are installed at different positions, the sensing zone of the obstacle sensing module 100 may be widened.

Figure 15A:
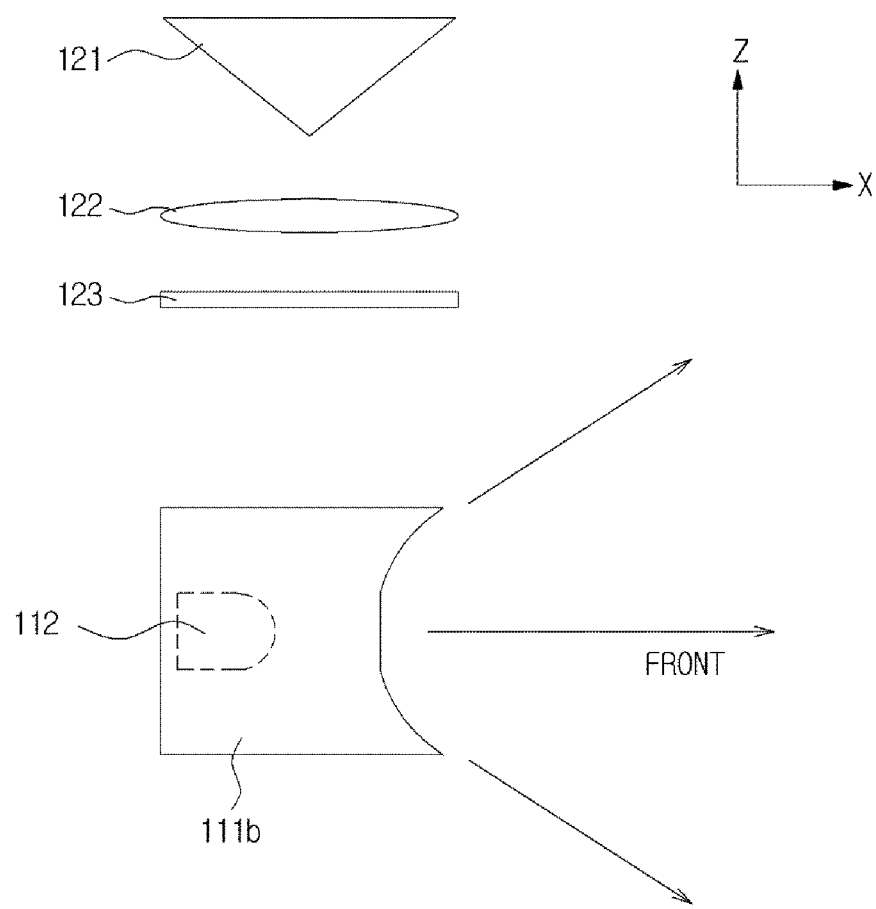
FIG. 15A is an elevation view illustrating an arrangement in which the second wide-angle lens is vertically arranged to allow the obstacle sensing module to sense a fall point in accordance with an exemplary embodiment.
Figure 15B:
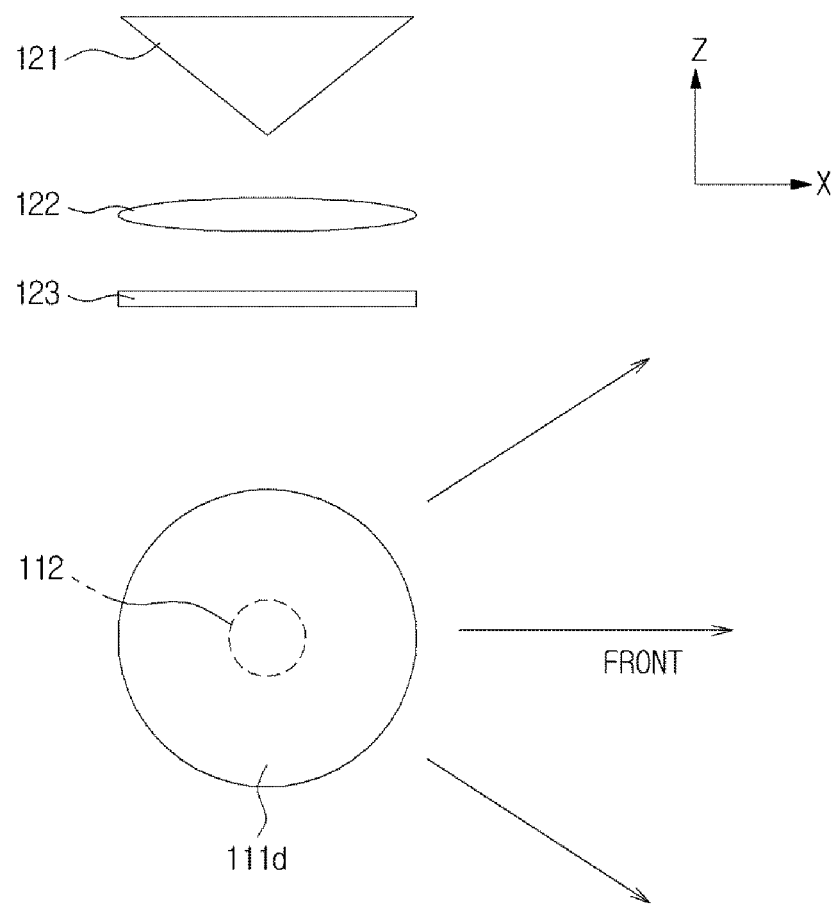
FIG. 15B is an elevation view illustrating an arrangement in which the fourth wide-angle lens is vertically arranged to allow the obstacle sensing module to sense a fall point in accordance with an exemplary embodiment.

FIG. 15A is an elevation view illustrating an arrangement in which the second wide-angle lens is vertically arranged to allow the obstacle sensing module to sense a fall point in accordance with an exemplary embodiment. FIG. 15B is an elevation view illustrating an arrangement in which the fourth wide-angle lens is vertically arranged to allow the obstacle sensing module to sense a fall point in accordance with an exemplary embodiment.

Referring to FIG. 15A, the second wide-angle lens 110b is vertically arranged. For example, the second wide-angle lens 110b is vertically elongated from the floor. In accordance with such an arrangement, planar light irradiated from the second wide-angle lens 110b is emitted in a forward direction in an x-z plane.

The light emitter 110 may be equipped with a slit (not shown). The slit may enable irradiation of thin planar light.

Referring to FIG. 15B, the fourth wide-angle lens 110d is vertically arranged. For example, the fourth wide-angle lens 110d extends vertically from the floor. In accordance with such an arrangement, planar light irradiated from the fourth wide-angle lens 110d is emitted in an x-z plane.

The light emitter 110 may be equipped with a slit (not shown). The slit may enable irradiation of thin planar light.

Figure 16A:
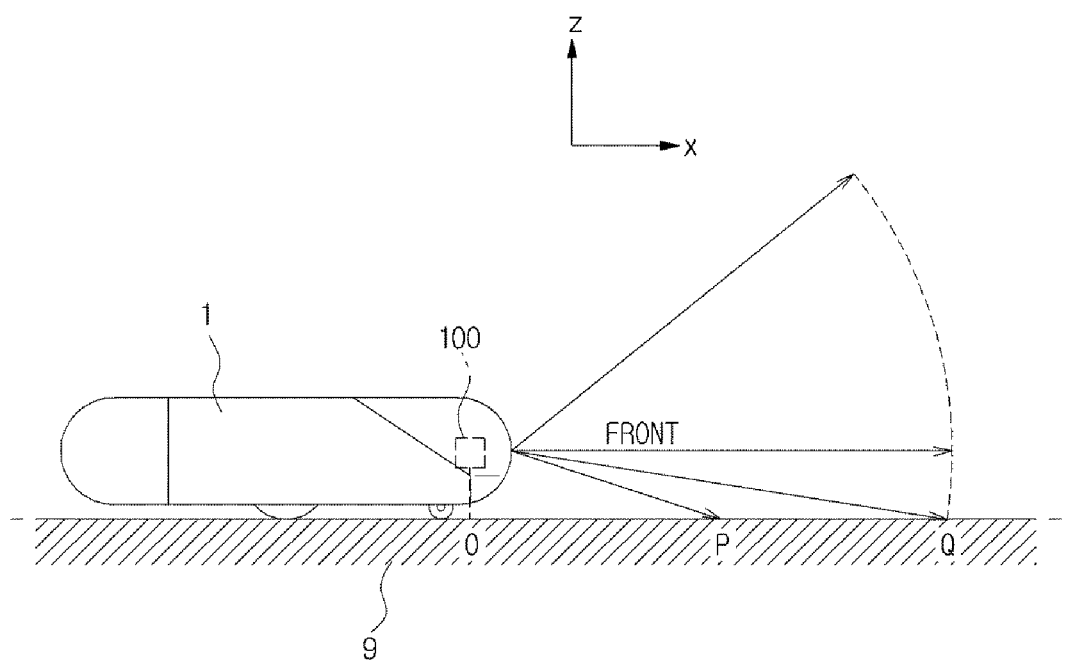
FIG. 16A is a view of a state in which the obstacle sensing module irradiates planar light when there is no fall point in accordance with an exemplary embodiment.
Figure 16B:
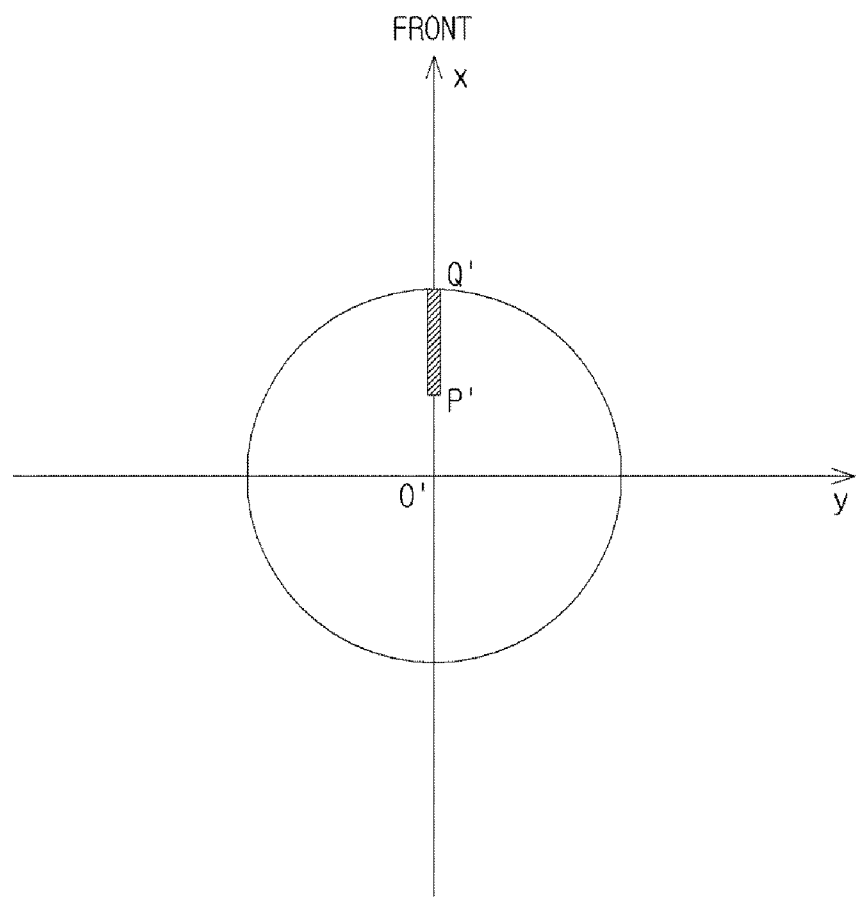
FIG. 16B is a view illustrating an image of planar light received by the image sensor after being reflected from the floor when there is no fall point in accordance with an exemplary embodiment.

FIG. 16A is a view of a state in which the obstacle sensing module irradiates planar light when there is no fall point in accordance with an exemplary embodiment. FIG. 16B is a view illustrating an image of planar light received by the image sensor after being reflected from the floor when there is no fall point in accordance with an exemplary embodiment.

Referring to FIG. 16A, the obstacle sensing module 100 of the cleaning robot 1 is installed within the cleaning robot 1. In order to determine a fall point, the obstacle sensing module 100 may include one of the first to fourth wide-angle lenses (not shown). The wide-angle lens is vertically inclined.

Of course, the obstacle sensing module 100 is not limited to the above-described configuration. The obstacle sensing module 100 may have various configurations, so long as it emits light in a forward direction in an x-z plane.

Planar light irradiated from the obstacle sensing module 100 may advance toward the floor in a forward direction of the obstacle sensing module 100. The floor is designated by reference numeral "9". Planar light irradiated from the obstacle sensing module 100 may reach a region on the floor 9 between a point P disposed near the front side of the cleaning robot 1 and a point Q disposed far from the front side of the cleaning robot 1. In this case, the light reaching region of the floor 9 in front of the obstacle sensing module 100 may be a region extending in a forward direction while having a line shape.

Planar light advancing toward the floor 9 is reflected from the floor 9, and is then transmitted to the obstacle sensing module 100.

FIG. 16B illustrates an image of reflection light reflected from the floor 9 and written in the optical sensor 123. Since light is emitted from the light emitter (not shown) in a forward direction in the x-z plane, reflection light is written in the optical sensor 123 in the form of a line extending in a direction far from a center O'.

Here, the near point P' means a floor point P disposed just in front of the cleaning robot (not shown), whereas the fart point Q' means a farthest floor point Q which may be sensed by the cleaning robot (not shown).

The obstacle sensing controller or control unit analyzes images, based on the digital image signals, into which the images have been converted, to determine whether there is a fall point in front of the obstacle sensing module 100. From the images written in the optical sensor 123, the obstacle sensing controller or control unit recognizes reflection light continuously reflected between a nearest point and a farthest point in front of the obstacle sensing module 100, to determine whether there is a fall point.

For example, the obstacle sensing controller or control unit may recognize that there is reflection light continuously reflected between the near point P' and the far point Q' in front of the cleaning robot, based on images written in the image sensor. In addition, the obstacle sensing controller or control unit may determine the distance from the cleaning robot to the farthest point Q, and may determine that there is no fall point in a floor region extending to the farthest point Q.

Figure 17A:
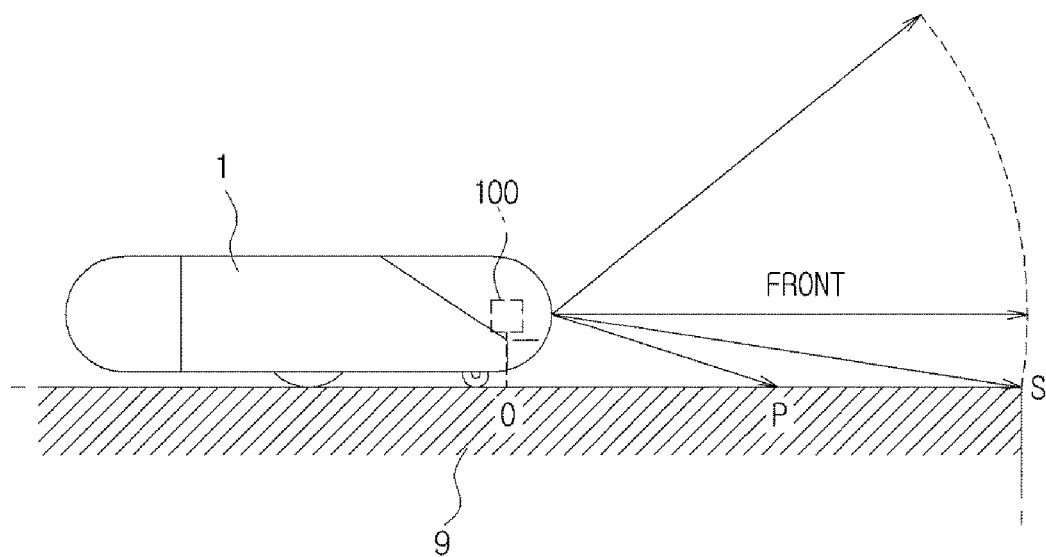
FIG. 17A is a view of a state in which the obstacle sensing module irradiates planar light when there is a fall point in accordance with an exemplary embodiment.
Figure 17B:
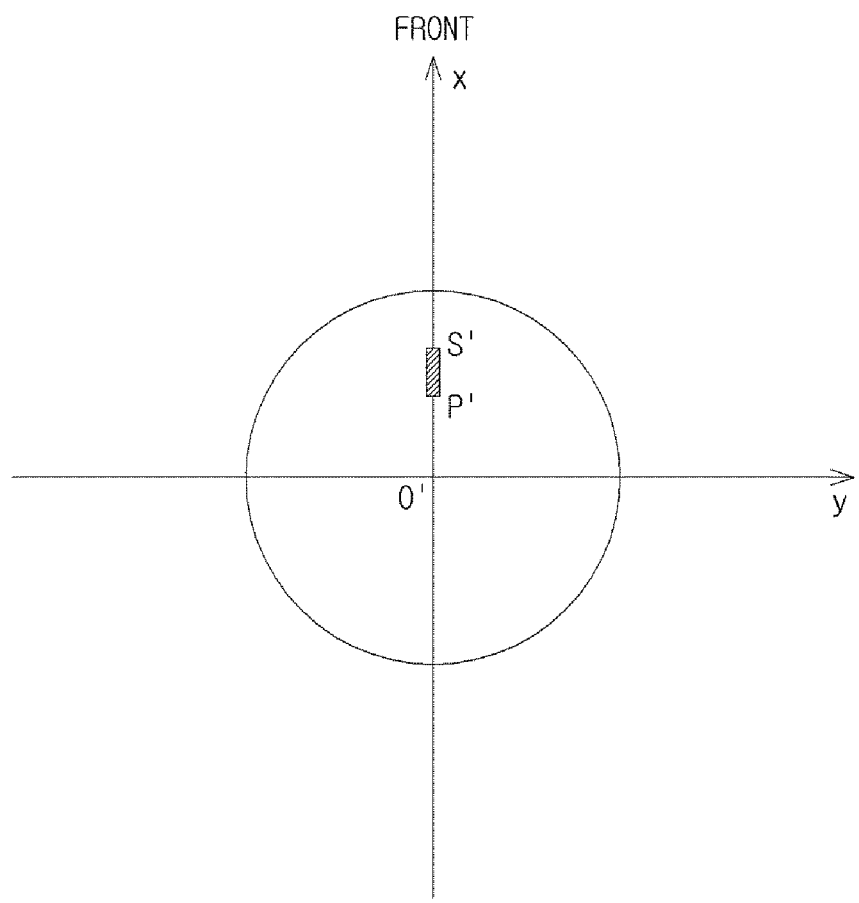
FIG. 17B is a view illustrating an image of planar light received by the image sensor after being reflected from the floor when there is a fall point in accordance with an exemplary embodiment.

FIG. 17A is a view of a state in which the obstacle sensing module irradiates planar light when there is a fall point in accordance with an exemplary embodiment. FIG. 17B is a view illustrating an image of planar light received by the image sensor after being reflected from the floor when there is a fall point in accordance with an exemplary embodiment.

Referring to FIG. 17A, the obstacle sensing module 100 of the cleaning robot 1 is installed within the cleaning robot 1. In order to determine a fall point, the obstacle sensing module 100 may include one of the first to fourth wide-angle lenses (not shown). The wide-angle lens is vertically inclined. Of course, the obstacle sensing module 100 is not limited to the above-described configuration. The obstacle sensing module 100 may have various configurations, so long as it emits light in a forward direction in an x-z plane.

Planar light irradiated from the obstacle sensing module 100 may advance toward the floor in a forward direction of the obstacle sensing module 100. The floor is designated by reference numeral "9". Planar light irradiated from the obstacle sensing module 100 may reach a region on the floor 9 between a point P disposed near the front side of the cleaning robot 1 and a fall point S disposed far from the front side of the cleaning robot 1. In this case, the light reaching region of the floor 9 in front of the obstacle sensing module 100 may be a region extending in a forward direction while having a line shape.

Planar light advancing toward the floor 9 is reflected from the floor 9, and is then transmitted to the obstacle sensing module 100.

FIG. 17B illustrates an image of reflection light reflected from the floor 9 and written in the optical sensor 123. Since light is emitted from the light emitter (not shown) in a forward direction in the x-z plane, reflection light is written in the optical sensor 123 in the form of a line extending in a direction far from a center O'.

Referring to FIG. 17B, the image written in the optical sensor 123 may have a line shape extending between points P' and S'. Here, the point P' refers to a nearest point P of the floor 9 disposed in front of the cleaning robot (not shown), whereas the point S' refers to a fall point S disposed in front of the cleaning robot (not shown).

The obstacle sensing controller or control unit analyzes images, based on the digital image signals, into which the images have been converted, to determine whether there is a fall point in front of the obstacle sensing module 100.

From the images written in the optical sensor 123, the obstacle sensing controller or control unit recognizes reflection light continuously reflected between a nearest point and a farthest point in front of the obstacle sensing module 100, to determine whether there is a fall point.

For example, the obstacle sensing controller or control unit may recognize that there is reflection light continuously reflected between the near point P' and the fart point S' in front of the cleaning robot, based on images written in the image sensor. In addition, the obstacle sensing controller or control unit may determine the distance from the cleaning robot to the far point S, and may determine that there is a fall point at the far point S.

In addition, the obstacle sensing controller or control unit may calculate the distance between the cleaning robot (not shown) and the fall point.

As apparent from the above description, it may be possible to generate uniform planar light, using an obstacle sensing module according to an exemplary embodiment, and thus to achieve an enhancement in obstacle sensing accuracy. Using planar light, it may be possible to sense obstacles present around the obstacle sensing module. Accordingly, it may be unnecessary to mount a plurality of sensors or a separate servo mechanism. In this regard, enhanced efficiency in terms of economy and structure may be achieved.

The cleaning robot, which is equipped with the obstacle sensing module, may accurately sense obstacles present therearound and, as such, may efficiently travel.

The cleaning robot, which is equipped with the obstacle sensing module, may efficiently control the obstacle sensing module in accordance with the state of the cleaning robot.

Although a few exemplary embodiments have been shown and described, it would be appreciated by those skilled in the art that changes may be made in these embodiments without departing from the principles and spirit of the disclosure, the scope of which is defined in the claims and their equivalents.

What is claimed is:

1. A cleaning robot comprising a body, a driver to drive the body, an obstacle sensing module to sense an obstacle present around the body, and a control unit to control the driver, based on sensed results of the obstacle sensing module, wherein the obstacle sensing module comprises:
   at least one light emitter comprising a light source, a wide-angle lens to refract or reflect light incident from the light source to diffuse the incident light in the form of planar light, and a light source driver to drive the light source to emit light; and
   a light receiver comprising a reflection mirror to reflect reflection light reflected by the obstacle, an optical lens spaced from the reflection mirror by a predetermined distance, to allow the reflection light to pass through the optical lens, an image sensor to receive the reflection light emerging from the optical lens and to generate an image signal from the reflection light emerging from the optical lens, and an image processing circuit to receive the image signal, and to convert the received image signal into an electrical image signal in the form of a digital image signal.

2. The cleaning robot according to claim 1, wherein the obstacle sensing module further comprises an obstacle sensing controller to generate optical control signals to control turn-on/off of the light source, and to generate obstacle sensing information, based on the digital image signal.

3. The cleaning robot according to claim 2, wherein the control unit generates a drive control signal, based on the obstacle sensing information.

4. The cleaning robot according to claim 1, wherein the control unit generates optical control signals to control turn-on/off of the light source, generates obstacle sensing information, based on the digital image signal, or generates a drive control signal, based on the obstacle sensing information.

5. The cleaning robot according to claim 2, wherein the obstacle sensing information comprises at least one of a distance from the body to the obstacle, a position of the obstacle, a height of the obstacle, a shape of the obstacle, and a fall point.

6. The cleaning robot according to claim 2, wherein the optical control signal to control turn-off of the light source is generated when the cleaning robot is lifted from a floor.

7. The cleaning robot according to claim 2, wherein the optical control signal to control turn-on of the light source is generated when the cleaning robot starts to travel, and the optical control signal to control turn-off of the light source is generated when the cleaning robot completes traveling.

8. A cleaning robot comprising a body, a driver to drive the body, an obstacle sensing module to sense an obstacle present around the body, and a control unit to control the driver, based on sensed results of the obstacle sensing module, wherein the obstacle sensing module comprises:
   at least one light emitter comprising a light source, and a wide-angle lens to diffuse light incident from the light source in the form of planar light; and
   a light receiver comprising an image sensor to receive reflection light reflected by the obstacle and to generate an image signal from the reflection light.

9. An obstacle sensing module installed in a cleaning robot, comprising:
  at least one light emitter comprising a light source, a wide-angle lens to refract or reflect light incident from the light source to diffuse the incident light in the form of planar light, and a light source driver to drive the light source to emit light; and
  a light receiver comprising a reflection mirror to reflect reflection light reflected by an obstacle to generate reflection light, an optical lens spaced from the reflection mirror by a predetermined distance, to allow the reflection light to pass through the optical lens, an image sensor to receive the reflection light emerging from the optical lens to generate an image signal from the reflection light emerging from the optical lens, and an image processing circuit to receive the image signal, and to convert the received image signal into an image signal in the form of a digital image signal.

10. The obstacle sensing module according to claim 9, wherein the light emitter further comprises a slit disposed in front of the wide-angle lens, to adjust a thickness of the planar light.

11. The obstacle sensing module according to claim 9, wherein the optical lens is arranged between the reflection mirror and the image sensor, and the light emitter is arranged in front of the image sensor.

12. The obstacle sensing module according to claim 9, wherein the at least one light emitter comprises a plurality of light emitters disposed at different positions on the cleaning robot and being arranged at a same level from a floor.

13. The obstacle sensing module according to claim 12, wherein the plurality of light emitters diffuses planar light in a simultaneous manner or in a sequential manner.

14. The obstacle sensing module according to claim 12, wherein:
  the plurality of light emitters comprises first to third light emitters disposed on the cleaning robot;
  the light receiver is disposed at a front side of the cleaning robot;
  the first light emitter is arranged in front of the light receiver;
  the second light emitter is spaced from the first light emitter in a left direction by a predetermined distance; and
  the third light emitter is spaced from the first light emitter in a right direction by a predetermined distance.

15. The obstacle sensing module according to claim 12, wherein:
  the plurality of light emitters comprises first to fourth light emitters disposed on the cleaning robot;
  the light receiver is disposed at a front side of the cleaning robot;
  the first and second light emitters are spaced from the light receiver in a left direction by a predetermined distance; and
  the third and fourth light emitters are spaced from the light receiver in a right direction by a predetermined distance.

16. The obstacle sensing module according to claim 9, wherein the reflection mirror is a conical reflection mirror arranged such that an apex of the conical reflection mirror faces the image sensor.

17. The obstacle sensing module according to claim 9, wherein the reflection mirror has a conical structure formed with a conical surface having a side surface portion extending from a bottom surface of the conical structure to a predetermined height and having a concave shape, and a side surface portion extending from the predetermined height to an apex of the conical structure and having a convex shape.

18. The obstacle sensing module according to claim 9, wherein a filter is coated over a surface of the reflection mirror or a surface of the optical lens, to allow light having a wavelength of the planar light to pass through the optical lens.

19. The obstacle sensing module according to claim 9, further comprising:
  an obstacle sensing controller to generate optical control signals to control turn-on/off of the light source, and to generate obstacle sensing information, based on the digital image signal.

20. The obstacle sensing module according to claim 19, wherein the obstacle sensing information comprises at least one of a distance from the body to the obstacle, a position of the obstacle, a height of the obstacle, a shape of the obstacle, and a fall point.

21. The obstacle sensing module according to claim 9, wherein the at least one light emitter comprises a plurality of light emitters disposed at different positions on the robot or at different levels from a floor.

22. The obstacle sensing module according to claim 9, wherein the at least one light emitter comprises a plurality of light emitters disposed at a same position on the robot and at different levels from a floor.

* * * * *